(12) United States Patent
Gysling et al.

(10) Patent No.: US 6,536,291 B1
(45) Date of Patent: Mar. 25, 2003

(54) OPTICAL FLOW RATE MEASUREMENT USING UNSTEADY PRESSURES

(75) Inventors: Daniel L. Gysling, Glastonbury, CT (US); Rebecca S. McGuinn, Middletown, CT (US); Charles R. Winston, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/345,827

(22) Filed: Jul. 2, 1999

(51) Int. Cl.⁷ .................................................. G01F 1/34

(52) U.S. Cl. .................................................. 73/861.42

(58) Field of Search ........................ 73/861.42, 40.5 A, 73/61 R, 194 B, 861.04, 861.08, 202, 861.24, 861.22; 181/251; 250/227.19

(56) References Cited

U.S. PATENT DOCUMENTS

| | | |
|---|---|---|
| 3,149,492 A | 9/1964 | Weinberg |
| 3,851,521 A | 12/1974 | Ottenstein |
| 4,080,837 A | 3/1978 | Alexander |
| 4,114,439 A | 9/1978 | Fick |
| 4,144,768 A | 3/1979 | Andersson |

(List continued on next page.)

FOREIGN PATENT DOCUMENTS

| | | |
|---|---|---|
| DE | 19511234 | 12/1995 |
| EP | 0684458 | 5/1995 |
| FR | 2 357 868 | 7/1976 |
| JP | 406082281 | 9/1992 |
| WO | WO 93/14382 | 7/1993 |
| WO | WO 96/04528 | 2/1996 |
| WO | WO 00/00793 | 1/2000 |

OTHER PUBLICATIONS

Mesch, F. (1990) "Speed and Flow Measurement by an Intelligent Correlation System", Advances in Instrumentation and Control, Research Triangle Park, NC, part 4, p. 1899–1914.

Specification for U.S. patent application Ser. No. 09/344,069, filed Jun. 25, 1999, Attorney docket: WEAF:106.

Gysling, D. (1999) "Development of a Fiber Optic Downhole Multiphase Flow Meter", in "Field Applications & New Technologies for Multiphase Metering", Multiphase Technology Series Conference, Aberdeen Scotland.

(List continued on next page.)

Primary Examiner—Harshad Patel
(74) Attorney, Agent, or Firm—Howrey Simon Arnold & White, LLP

(57) ABSTRACT

A fiber optic strain gauge based flow rate measurement system includes two measurement regions located an average axial distance $\Delta X$ apart along the pipe, the first measurement region having two fiber optic strain gauges located a distance $X_1$ apart, and the second measurement region having two other fiber optic strain gauges located a distance $X_2$ apart, each capable of measuring the unsteady pressure in the pipe 12. Signals from each pair of fiber optic strain gauges are differenced by summers to form spatial wavelength filters. Each spatial filter filters out acoustic pressure disturbances $P_{acoustic}$ and other long wavelength pressure disturbances in the pipe and passes short-wavelength low-frequency vortical pressure disturbances $P_{vortical}$ associated with the vortical flow field. The spatial filters provide signals to band pass filters that filter out high frequency signals. The $P_{vortical}$-dominated filtered signals from the two sensing regions are cross-correlated to determine a time delay $\tau$ between the two sensing locations which is divided into the distance $\Delta X$ to obtain a convection velocity $U_c(t)$ that is related to an average flow rate of the fluid (i.e., one or more liquids and/or gases) flowing in the pipe 12. The invention may also be configured detect the velocity of any desired inhomogeneous pressure field in the flow.

28 Claims, 13 Drawing Sheets

U.S. PATENT DOCUMENTS

| | | | |
|---|---|---|---|
| 4,159,646 A | 7/1979 | Paulsen | |
| 4,164,865 A | 8/1979 | Hall | |
| 4,236,406 A | 12/1980 | Reed | |
| 4,275,602 A | 6/1981 | Fujishiro | |
| 4,445,389 A | 5/1984 | Potzick | |
| 4,499,418 A | 2/1985 | Helms | |
| 4,515,473 A | 5/1985 | Mermelstein | |
| 4,520,320 A | 5/1985 | Potzick | |
| 4,546,649 A * | 10/1985 | Kantor | 73/168 |
| 4,706,501 A | 11/1987 | Atkinson | |
| 4,788,852 A | 12/1988 | Martin | |
| 4,813,270 A | 3/1989 | Baillie | |
| 4,862,750 A | 9/1989 | Nice | |
| 4,864,868 A * | 9/1989 | Khalifa | 73/861.24 |
| 4,884,457 A | 12/1989 | Hatton | |
| 4,896,540 A | 1/1990 | Shakkottai | |
| 4,932,262 A | 6/1990 | Wlodarczyk | |
| 4,947,127 A | 8/1990 | Helms | |
| 4,950,883 A | 8/1990 | Glenn | |
| 4,976,151 A | 12/1990 | Morishita | |
| 4,996,419 A | 2/1991 | Morey | |
| 5,024,099 A | 6/1991 | Lee | |
| 5,031,460 A | 7/1991 | Kanekobu | |
| 5,040,415 A | 8/1991 | Barkhoudarian | |
| 5,051,922 A | 9/1991 | Toral | |
| 5,058,437 A | 10/1991 | Chaumont | |
| 5,083,452 A | 1/1992 | Hope | 73/61 R |
| 5,099,697 A | 3/1992 | Agar | |
| 5,115,670 A | 5/1992 | Shen | |
| 5,152,181 A * | 10/1992 | Lew | 73/861.02 |
| 5,207,107 A | 5/1993 | Wolf | |
| 5,218,197 A | 6/1993 | Carroll | 250/227.19 |
| 5,317,576 A | 5/1994 | Leonberger | |
| 5,321,991 A | 6/1994 | Kalotay | |
| 5,347,873 A | 9/1994 | Vander Heyden | |
| 5,361,130 A | 11/1994 | Kersey | |
| 5,363,342 A | 11/1994 | Layton et al. | 367/149 |
| 5,367,911 A | 11/1994 | Jewell | |
| 5,372,046 A | 12/1994 | Kleven | |
| 5,398,542 A | 3/1995 | Vasbinder | 73/40.5 |
| 5,401,956 A | 3/1995 | Dunphy | |
| 5,426,297 A | 6/1995 | Dunphy | |
| 5,440,932 A | 8/1995 | Wareham | |
| 5,493,390 A | 2/1996 | Varasi | |
| 5,493,512 A | 2/1996 | Peube | |
| 5,513,913 A | 5/1996 | Ball | |
| 5,564,832 A | 10/1996 | Ball | |
| 5,576,497 A | 11/1996 | Vignos | |
| 5,591,922 A | 1/1997 | Segeral et al. | 73/861.04 |
| 5,597,961 A | 1/1997 | Marrelli | |
| 5,639,667 A | 6/1997 | Heslot | |
| 5,642,098 A | 6/1997 | Santa Maria | |
| 5,644,093 A | 7/1997 | Wright | |
| 5,654,551 A | 8/1997 | Watt | |
| 5,670,720 A | 9/1997 | Clark | |
| 5,680,489 A | 10/1997 | Kersey | |
| 5,689,540 A | 11/1997 | Stephenson | |
| 5,708,211 A | 1/1998 | Jepson | |
| 5,730,219 A | 3/1998 | Tubel | |
| 5,732,776 A | 3/1998 | Tubel | |
| 5,741,980 A | 4/1998 | Hill et al. | 73/861.04 |
| 5,803,167 A | 9/1998 | Bussear | |
| 5,804,713 A | 9/1998 | Kluth | |
| 5,842,347 A | 12/1998 | Kinder | |
| 5,845,033 A | 12/1998 | Berthold et al. | 385/12 |
| 5,906,238 A | 5/1999 | Carmody | |
| 5,907,104 A | 5/1999 | Cage | |
| 5,908,990 A | 6/1999 | Cummings | |
| 5,925,821 A | 7/1999 | Bousquet | |
| 5,925,879 A | 7/1999 | Hay | |
| 5,939,643 A | 8/1999 | Oertel | |
| 5,956,132 A | 9/1999 | Donzier | |
| 5,959,547 A | 9/1999 | Tubel | |
| 5,963,880 A | 10/1999 | Smith | |
| 5,975,204 A | 11/1999 | Tubel | |
| 5,992,519 A | 11/1999 | Ramakrishnan | |
| 5,996,690 A | 12/1999 | Shaw | |
| 6,002,985 A | 12/1999 | Stephenson | |
| 6,003,383 A | 12/1999 | Zielinska | |
| 6,003,385 A | 12/1999 | De Vanssay | |
| 6,009,216 A | 12/1999 | Pruett | |
| 6,016,702 A | 1/2000 | Maron | |
| 6,158,288 A * | 12/2000 | Smith | 73/861.25 |
| 6,216,532 B1 | 4/2001 | Stephenson | |
| 6,233,374 B1 | 5/2001 | Ogle | |
| 6,279,660 B1 | 8/2001 | Hay | |
| 6,354,147 B1 | 3/2002 | Gysling | |

OTHER PUBLICATIONS

Beranek, L. and Ver, I. (1992) in "Noise and Vibration Control Engineering, Principles and Application", John Wiley & Sons, Inc., Chapter 14, p:537–541.

Dowling, A. and Williams, J. in "Sound and Sources of Sound", Ellis Horwood Limited, Section 4, p:79–80.

Kersey, A. et al. (1993) "Multiplexed Fiber Bragg Grating Strain–Sensor System with a Fiber Fabry–Perot Wavelength Filter", Optics Letters, 18:1370–1372.

Dandridge, A. & Cogdell, G. (1991) "Fiber Optic Sensors for Navy Applications", IEEE, LCS, 2:81–89.

Nielsen, R. (1991) "Sonar Signal Processing", Artech Huse Inc., Chapter 2, p:51–59.

Krim A. and Viberg M. (1996) "Two Decades of Array Signal Processing Research", IEEE Signal Processing Magazine, p:67–94.

Kersey A. and Darkin, J., Editors (1992) SPIE vol. 1586, "Distributed and Multiplexed Fiber Optic Sensors", p:1–243.

Nerby et al. "A cost effective technique for production well testig", (1995) Offshore Technology Conference, p:505–515.

"Noise and Vibration Control Engineering Principles and Applications", Leo L. Beranek and Istvan L. Ver, A Wiley Interscience Publication, pp. 537–541.

"Mandrel–Wound Fiber Optic Pressure Sensor", P. Ogle, D. Gysling and A. Kersey, Docket CC–0033, pp. 1–22.

CiDRA Presentation on "Flow Meter", Dec. 7–18, 1998, Houston, TX.

"Sound and Sources of Sound", by A. P. Dowling and J. E. Williams, pp. 224–229.

* cited by examiner

OPTICAL FLOW RATE MEASUREMENT USING UNSTEADY PRESSURES

CROSS REFERENCES TO RELATED APPLICATIONS

This application is related to U.S. patent application Ser. Nos. 09/346,604, 09/346,605, 09/346,606, and 09/346,607, all filed Jul. 2, 1999.

TECHNICAL FIELD

This invention relates to the measurement of flow rate of a fluid and more particularly to measuring flow rate using unsteady pressure measurements.

BACKGROUND ART

In many industries it is desirable to measure the flow rate of a multiphase fluid. In the oil and gas industry, or comparable industries, for example, it is desirable to measure the flow rate of multiphase fluids, especially fluids having three phases, such as oil, water, and gas. It is known also to measure the flow rate of certain fluids (one or more liquids and/or gases) in a pipe using cross-correlation flow meters. Such meters measure an element of the flow that moves or convects with (or is related to) the fluid flow (or a group of fluid particles). The meter measures this element at two locations separated by a known distance along the flow path and then calculates the time for such element to move between the two locations. The time delay is determined by a cross-correlation of the two measured signals. A velocity is then determined by the distance between the measurements divided by the time delay. The flow velocity is then related to the flow rate by calibration.

One such cross-correlation meter that measures flow rate in a multiphase flow is described in U.S. Pat. No. 5,591,922, entitled "Method and Apparatus for Measuring Multiphase Flow," to Segeral et al., issued Jan. 7, 1997. In that case, a pair of venturis are located a predetermined distance apart which induce a change in flow speed through the venturi and a resulting pressure difference (or delta-P) across each venturi, which are measured. The delta-P pressure signals measured at each venturi are cross-correlated to determine the time delay which is indicative of the total volume flow rate. However, such a technique requires a change in the flow properties (e.g., flow velocity or density) at the two measurement points to make the measurement. Also, the delta-P is generated with an area contraction or constriction, and is not a naturally occurring observable characteristic of the fluid.

SUMMARY OF THE INVENTION

Objects of the present invention include provision of a system for measuring the flow rate (or velocity) of fluid flow in pipes.

According to the present invention, an apparatus for measuring a velocity of a fluid moving in a pipe comprises a first filter which measures a vortical pressure field at a first axial location along the pipe which provides a first pressure signal indicative of the vortical pressure field; a second filter which measures the vortical pressure field at a second axial location along the pipe which provides a second pressure signal indicative of the vortical pressure field; and a signal processor, responsive to the first and the second pressure signals, which provides a velocity signal indicative of a velocity of the vortical pressure field moving in the pipe.

According further to the present invention, the first and the second filters pass wavelengths associated with the vortical pressure field and not associated with an acoustic pressure field. According further to the present invention, the first filter comprises a first spatial filter; and the second filter comprises a second spatial filter. According still further to the present invention, the vortical pressure field comprises a vortical pressure field. Still further according to the present invention, the first and the second filters pass wavelengths associated with the vortical pressure field and not associated with an acoustic pressure field. According further to the present invention, the spatial filter filters out wavelengths above a predetermined wavelength. Still further according to the present invention, at least one of the pressure sensors comprises a strain gauge disposed on a surface of the pipe. Further according to the present invention, the strain gauge comprises a fiber optic strain gauge.

Still further according to the present invention, the signal processor comprises logic which calculates a cross-correlation between the first and the second vortical pressure signals and provides a time delay signal indicative of the time it takes for the vortical pressure field to move from the first location to the second location. Further according to the present invention, the velocity signal is indicative of the velocity of the fluid moving in the pipe.

The present invention provides a significant improvement over the prior art by providing a measurement of the average flow rate of fluid flow in a pipe or other conduit (where a fluid is defined as one or more liquids and/or gases) without requiring a flow restriction in the pipe or any other change in the flow velocity of the fluid.

The present invention determines a convection velocity by measuring unsteady (or dynamic or ac) pressures and extracting the pressure signal indicative of a vortical pressure (or flow) field (or perturbation) which convects at or near the average velocity of the fluid. The vortical pressure field is then used to determine the convection velocity by cross-correlation techniques, such convection velocity being proportional (or approximately equal to) the flow rate of the fluid. If needed, the flow rate of the fluid may then be determined by calibrating the convection velocity to the flow rate.

The invention may be used to measure the velocity of any inhomogeneous flow field, such as gas bubbles, gas slugs, particles, or chunks of material, and its associated pressure field that propagates in a flow provided the spatial filters have a separation within the acceptable coherence length of the flow field to be measured and the sensor spacing within each spatial filter is longer than a characteristic spatial (axial or transverse) length of the flow field. Also, the invention may be used to detect different flow rates within the same mixture (e.g., the flow rate of a vortical pressure field as well as other inhomogeneous pressure fields).

Also, the invention may be used with any combinations of liquids and/or gases. The invention may be used in a flow meter for use in oil or gas wells to determine the flow rate of a multiphase fluid, such as a three phase fluid of oil, water, and gas. The invention will also work in any other environment or applications or any other fluids (one or more liquids and/or gases) or mixtures. The invention will work with any pipe or tube or with any conduit that carries fluid. Also, the invention has no inherent flow range limitations, and, as such, can measure very low flow rates and has no maximum flow rate limit. The invention will also work if the fluid is flowing in either direction in the pipe. Further, the invention may be used directly on a pipe or on a tube inserted into a flowing fluid.

The foregoing and other objects, features, and advantages of the present invention will become more apparent in light of the following detailed description of exemplary embodiments thereof.

BEST MODE FOR CARRYING OUT THE INVENTION

Figure 1:
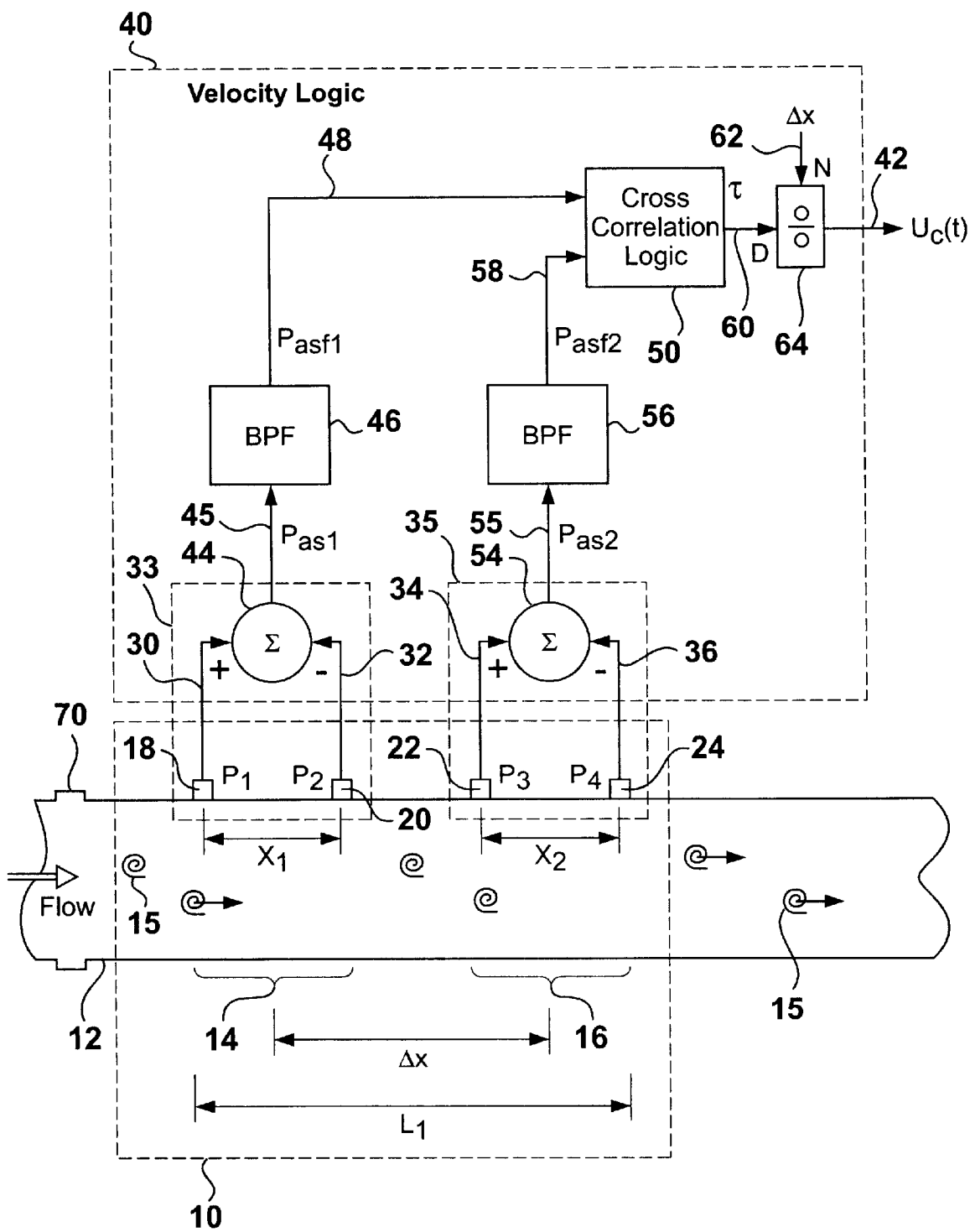
FIG. 1 is a schematic block diagram of a velocity measurement system.

Referring to FIG. 1, a velocity and flow measurement system includes a sensing section 10 along a pipe 12 and a velocity logic section 40. The pipe (or conduit) 12 has two measurement regions 14, 16 located a distance ΔX apart along the pipe 12. At the first measurement region 14 are two unsteady (or dynamic or ac) optical pressure sensors 18, 20 located a distance $X_1$ apart and capable of measuring the unsteady pressure in the pipe 12, and at the second measurement region 16 are two other unsteady optical pressure sensors 22, 24 located a distance $X_2$ apart and capable of measuring the unsteady pressure in the pipe 12. Each pair of optical pressure sensors 18, 20 and 22, 24 act as spatial filters to remove certain acoustic signals from the unsteady pressure signals, and the distances $X_1$, $X_2$ are determined by the desired filtering characteristic for each spatial filter, as discussed hereinafter.

The flow measurement system 10 of the present invention measures velocities associated with unsteady flow fields and/or pressure disturbances associated therewith (represented by 15) relating to turbulent eddies (or vortical flow fields) inhomogeneously distributed in the flow (such as bubbles, slugs, and the like), or any other properties of the flow, fluid, or pressure having time varying or stochastic properties that are manifested at least in part in the form of unsteady pressures. The vortical flow fields 15 are, in general, comprised of pressure disturbances having a wide variation in length scales and which have a variety of coherence length scales, such as that described in the reference "Sound and Sources of Sound," A. P. Dowling et al., Halsted Press, 1983. Certain of these vortical flow fields convect at or near, or are related to, the mean velocity of at least one of the fluids within a mixture flowing in a pipe. More specifically, the vortices convect in a predictable manner with reference to the fluids. The vortical pressure disturbances 15 that contain information regarding convection velocity have temporal and spatial length scales as well as coherence length scales that differ from other disturbances in the flow. The present invention utilizes these properties to preferentially select disturbances of a desired spatial (axial or transverse) length scale and coherence length scale as will be more fully described hereinafter. For illustrative purposes, the terms vortical flow field and vortical pressure field will be used to describe the above-described group of unsteady pressure fields having the temporal and spatial length and coherence scales described herein.

The pressures $P_1$, $P_2$, $P_3$, $P_4$ may be measured through holes in the pipe 12 ported to external optical pressure sensors or by other techniques discussed hereinafter. The optical pressure sensors 18, 20, 22, 24 provide time-based pressure signals $P_1(t)$, $P_2(t)$, $P_3(t)$, $P_4(t)$ on lines 30, 32, 34, 36 respectively to velocity logic 40. The velocity logic provides a convection velocity signal $U_c(t)$ on a line 42 which is related to an average flow rate $U_f(t)$ of the fluid flowing in the pipe 12. The fluid may comprise one or more liquids and/or gases, or the gas(es) may be dissolved in the liquid or in free gas form, such as bubbles, slugs, sand, particulates, slurry, etc. The fluid may also include non-liquid elements therein as will be discussed more hereinafter.

Some or all of the functions within velocity logic 40 may be implemented in software (using a microprocessor or computer) and/or firmware, or may be implemented using analog and/or digital hardware having sufficient memory, interfaces, and capacity to perform the functions described herein.

In particular, in velocity logic 40, the pressure signal $P_1(t)$ on line 30 is provided to a positive input of a summer 44 and the pressure signal $P_2(t)$ on line 32 is provided to a negative input of the summer 44. The output of the summer 44 is provided on line 45 and is indicative of the difference between the two pressure signals $P_1$, $P_2$ (e.g., $P_1-P_2=P_{as1}$).

The optical pressure sensors 18, 20 together with the summer 44 create a spatial filter 33. The line 45 is fed to bandpass filter 46, which passes a predetermined passband of frequencies and attenuates frequencies outside the passband. In accordance with the present invention, the passband of the filter 46 is set to filter out (or attenuate) the dc portion and the high frequency portion of the input signals and to pass the frequencies therebetween. For example, in a particular embodiment, passband filter 6 is set to pass frequencies from about 1 Hz to about 100 Hz for a 3-inch inner diameter pipe flowing water at 10 ft/sec. Other passbands may be used in other embodiments if desired. Passband filter 46 provides a filtered signal $P_{asf1}$ on a line 48 to cross-correlation logic 50, described hereinafter.

The pressure signal $P_3(t)$ on line 34 is provided to a positive input of a summer 54 and the pressure signal $P_4(t)$ on line 36 is provided to a negative input of the summer 54. The pressure sensors 22, 24 together with the summer 54 create a spatial filter 35. The output of the summer 54 is provided on a line 55 indicative of the difference between the two pressure signals $P_3$, $P_4$ (e.g., $P_3-P_4=P_{as2}$). Line 55 is fed to a bandpass filter 56, similar to the bandpass filter 46 discussed hereinbefore, which passes frequencies within the passband and attenuates frequencies outside the passband. The filter 56 provides a filtered signal $P_{asf2}$ on line 58 to the cross-correlation logic 50. The signs on the summers 44, 54 may be swapped if desired, provided the signs of both summers 44, 54 are swapped together. In addition, the pressure signals $P_1$, $P_2$, $P_3$, $P_4$ may be scaled prior to presentation to the summers 44, 54.

Cross-correlation logic 50 calculates a known time domain cross-correlation between the signals $P_{asf1}$ and $P_{asf2}$ on lines 48, 58 respectively and provides an output signal on line 60 indicative of the time delay, $\tau$, it takes for an vortical flow field 15 (or vortex, stochastic, or vortical structure, field, disturbance or perturbation within the flow) to propagate from one sensing region 14 to the other sensing region 16. Such vortical flow disturbances, as is known, are coherent dynamic conditions that can occur in the flow which substantially decay (by a predetermined amount) over a predetermined distance (or coherence length) and convect (or flow) at or near the average velocity of the fluid flow. As described above, the vortical flow field 15 also has a stochastic or vortical pressure disturbance associated with it. In general, the vortical flow disturbances 15 are distributed throughout the flow, particularly in high shear regions, such as boundary layers (e.g., along the inner wall of the pipe 12) and are shown herein as discrete vortical flow fields 15. Because the vortical flow fields 15 (and the associated pressure disturbance) convect at or near the mean flow velocity, the propagation time delay $\tau$ is related to the velocity of the flow by the distance $\Delta X$ between the measurement regions 14, 16, as discussed hereinafter.

Although pressure disturbances associated with vortical flow fields 15 occur naturally in most flow conditions, an optional circumferential groove 70 may be used in the inner diameter of the pipe 12 to help generate unsteady flow fields in the form of vortices. However, the groove 70 is not required for the present invention to operate, due to the vortex generation which naturally occurs along the pipe inner wall, as discussed hereinbefore. Instead of a single circumferential groove 70, a plurality of axially spaced circumferential grooves may be used. The dimensions and geometries of the groove(s) 70 may be set based on the expected flow conditions and other factors. The axial cross-sectional shape of the groove 70 may be rectangular, square, triangular, circular, oval, star-shaped, or comprise other shapes. Other techniques may be used to generate vortices if desired, including those that may protrude within the inner diameter of pipe 12.

A spacing signal $\Delta X$ on line 62 indicative of the distance $\Delta X$ between the sensing regions 14, 16 is divided by the time delay signal $\tau$ on the line 60 by a divider 64 to provide an output signal on the line 42 indicative of the convection velocity $U_c(t)$ of the fluid flowing in the pipe 12 This parameter is related to (or proportional to or approximately equal to) the average (or mean) flow velocity $U_f(t)$ of the fluid, as defined below:

$$U_c(t)=\Delta X/\tau \; U_f(t) \qquad \text{Eq. 1}$$

The convection velocity $U_c(t)$ may then be calibrated to more precisely determine the mean velocity Uf(t) if desired. The result of such calibration may require multiplying the value of the convection velocity $U_c(t)$ by a calibration constant (gain) and/or adding a calibration offset to obtain the mean flow velocity $U_f(t)$ with the desired accuracy. Other calibration may be used if desired. For some applications, such calibration may not be required to meet the desired accuracy. The velocities $U_f(t)$, $U_c(t)$ may be converted to volumetric flow rates by multiplying the velocities by the cross-sectional area of the pipe.

Figure 2:
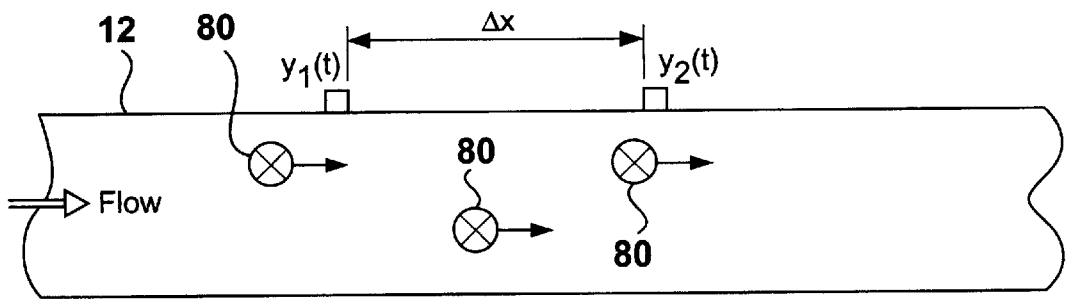
FIG. 2 is a side view of a pipe having two sensors that measure a parameter that convects with the flow in the pipe.
Figure 3:
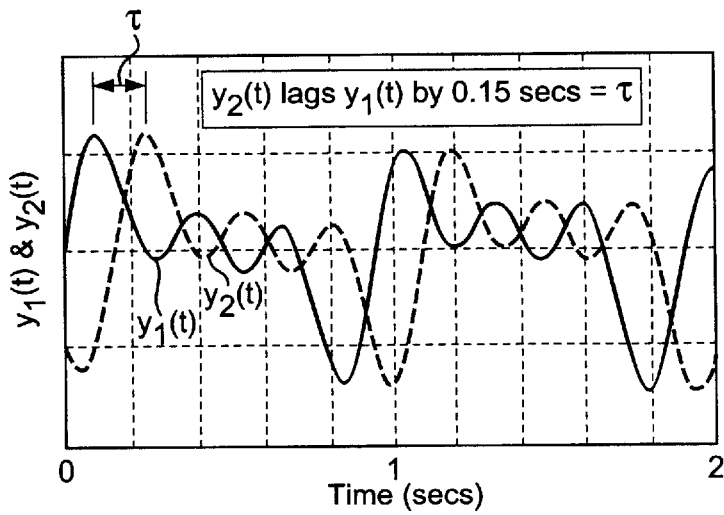
FIG. 3 is a graph of two curves, one from each of the two sensors of FIG. 2.
Figure 4:
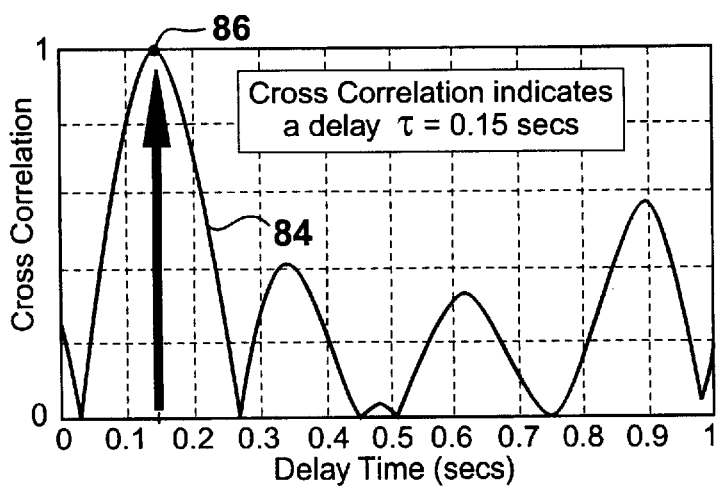
FIG. 4 is a graph of a cross-correlation between the two curves of FIG. 3.

Referring to FIGS. 2, 3, and 4, as is known, cross-correlation may be used to determine the time delay $\Delta X$ between two signals $y_1(t)$, $y_2(t)$ separated by a known distance $\Delta X$, where the signals are indicative of quantities 80 that convect with the flow (e.g., density perturbations, concentration perturbations, temperature perturbations, vortical pressure disturbances, and other quantities). In FIG. 3, the signal $y_2(t)$ lags behind the signal $y_1(t)$ by 0.15 seconds. If a time domain cross-correlation is taken between the two signals $y_1(t)$ and $y_2(t)$, the result is shown in FIG. 4 as curve 84. The highest peak 86 of the curve 84 shows that the best fit for the time lag r between the two signals $y_1(t)$ and $y_2(t)$ is at 0.15 seconds, which matches the reference time delay shown in FIG. 3.

Referring to FIG. 1, as discussed hereinbefore, since pressure disturbances associated within the vortical flow field 15 convect (or flow) at or near the average velocity of the fluid flowing in the pipe 12, the vortical pressure disturbances observed at the downstream location 16 are substantially a time lagged version of the vortical pressure disturbances observed at the upstream location 14. However, the total vortical pressure perturbations or disturbances in a pipe may be expressed as being comprised of vortical pressure disturbances ($P_{vortical}$), acoustic pressure disturbances ($P_{acoustic}$) and other types of pressure disturbances ($P_{other}$), as shown below expressed in terms of axial position along the pipe at any point in time:

$$P(x,t)=P_{vortical}(x,t)+P_{acoustic}(x,t)+P_{other}(x,t) \quad \text{Eq. 2}$$

As a result, the unsteady pressure disturbances $P_{vortical}$ can be masked by the acoustic pressure disturbances $P_{acoustic}$ and the other types of pressure disturbances $P_{other}$. In particular, the presence of the acoustic pressure disturbances that propagate both upstream and downstream at the speed of sound in the fluid (sonic velocity) can prohibit the direct measurement of velocity from the cross-correlation of direct vortical pressure measurements.

The present invention uses temporal and spatial filtering to precondition the pressure signals to effectively filter out the acoustic pressure disturbances $P_{acoustic}$ and other long wavelength (compared to the sensor spacing) pressure disturbances in the pipe 12 at the two sensing regions 14, 16, but retain a substantial portion of the vortical pressure disturbances $P_{vortical}$ associated with the vortical flow field 15 and any other short wavelength (compared to the sensor spacing) low frequency pressure disturbances $P_{other}$. Thus, if the low frequency pressure disturbances $P_{other}$ are small, they will not substantially impair the measurement accuracy of $P_{vortical}$.

The $P_{vortical}$ dominated signals from the two regions 14, 16 are then cross-correlated to determine the time delay $\tau$ between the two sensing locations 14, 16. more specifically, at the sensing region 14, the difference between the two optical pressure sensors 18, 20 creates a spatial filter 33 that effectively filters out (or attenuates) acoustic disturbances for which the wavelength, $\lambda$, of the acoustic waves propagating along the fluid is long (e.g., ten-to-one) compared to the spacing $X_1$ between the sensors. Other wavelength-to-sensor spacing ratios may be used to characterize the filtering, provided the wavelength-to-sensor spacing ratio is sufficient to satisfy the two-to-one spatial aliasing Nyquist criteria.

Thus, if the optical pressure sensors $P_1$, $P_2$ have an axial spacing $X_1$, and assuming that the spatial filter 33 will attenuate acoustic wavelengths longer than about 10 times the sensor spacing $X_1$, the smallest acoustic wavelength, $\lambda_{min}$, that is attenuated would be:

$$\lambda_{min}=10(X_1) \quad \text{Eq. 3}$$

One-dimensional acoustic disturbances are also governed by the following known inverse wavelength-frequency relation:

$$\alpha=a/f \text{ or } f=a/\lambda \quad \text{Eq.4}$$

where "a" is the speed of sound in the fluid, "f" is the frequency of the acoustic disturbance, and $\lambda$ is the wavelength of the acoustic disturbance.

Using Eq. 4, such a spatial filter would filter out frequencies below about:

$$f_{max}=a/\lambda_{min} \quad \text{Eq. 5}$$

For example, using water (a =5,000 ft/sec) with a sensor spacing $X_1$=3 inches, the above described spatial acoustic filtering would filter out acoustic frequencies up to a maximum frequency of about 2000 Hz (or 5,000*12/30). Thus, the acoustic frequency content of the output signal $P_{as1}$ of the spatial filter 33 (i.e., differenced vortical pressure signal) will be effectively removed for frequencies below about 2000 Hz and wavelengths above 30 inches (using Eq. 3).

The above discussion on the spatial filter 33 also applies to the second spatial filter 35 comprising the other pair of pressure signals $P_3$, $P_4$, axially spaced a distance $X_2$ apart, which provides the differenced vortical pressure signal $P_{as2}$.

Figure 5:
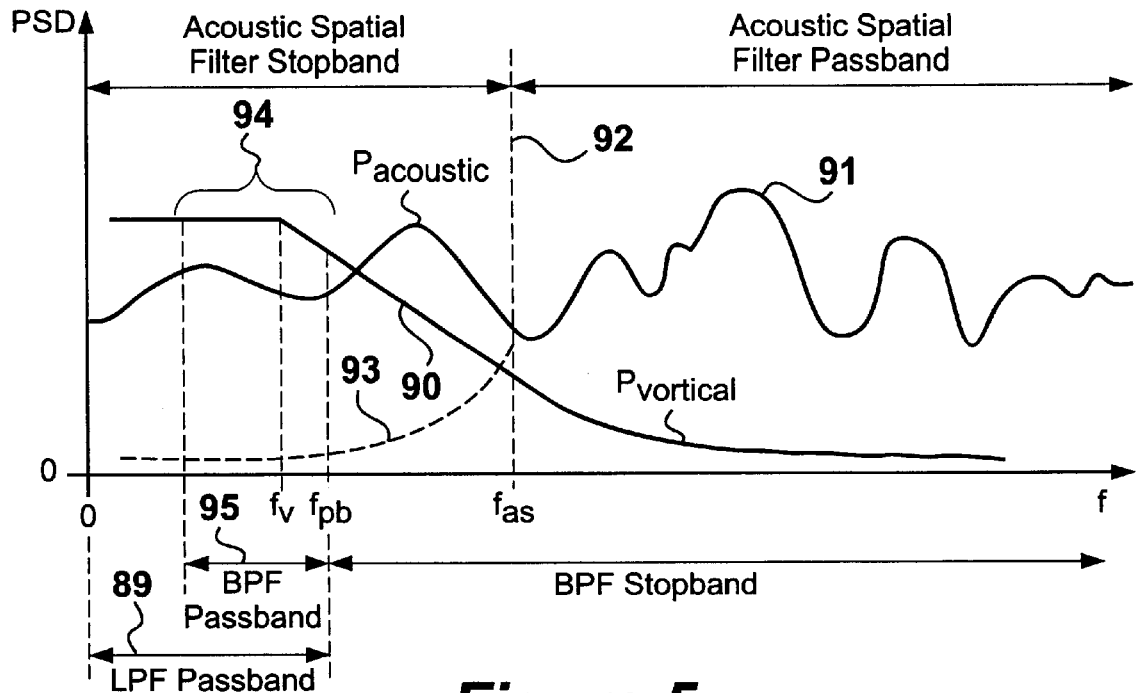
FIG. 5 is a graph of power spectral density plotted against frequency for an unsteady acoustic pressure signal $P_{acoustic}$ and an unsteady vortical pressure signal $P_{vortical}$.

Referring to FIG. 5, relevant features of the power spectral density (PSD) of typical vortical pressure disturbances $P_{vortical}$ is shown by a curve 90 that has a flat region (or bandwidth) up to a frequency $F_v$ and then decreases with increasing frequency f. The value of $F_v$ is approximately equal to U/r, where U is the flow rate and r is the radius of the pipe. For example, for a flow rate U of about 10 ft/sec and a pipe radius r of about 0.125 ft (or about 1.5 inches), the bandwidth $F_v$ of the vortical pressure disturbances $P_{vortical}$ would be about 80 Hz (10/0.125). The PSD of the acoustic pressure disturbances $P_{acoustic}$ has a profile that is determined by the environment and other factors and is indicated in the figure by an arbitrary curve 91, and typically has both low and high frequency components.

Figure 6:
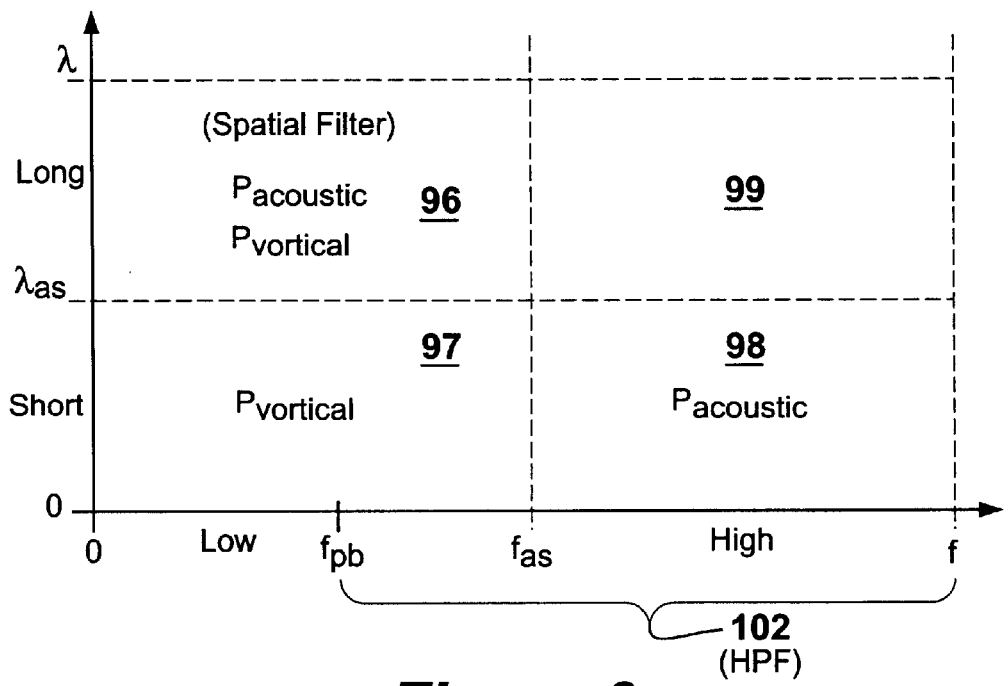
FIG. 6 is a graph of wavelength versus frequency for unsteady acoustic pressures $P_{acoustic}$ and unsteady vortical pressures $P_{vortical}$.

Referring to FIG. 6, in general, the acoustic pressure disturbances $P_{acoustic}$ have an inverse wavelength-frequency relationship as shown in Eq. 4, which has long wavelengths at low frequencies and short wavelengths at high frequencies as indicated by the regions 96, 98 respectively. Conversely, the vortical pressure disturbances $P_{vortical}$ have both long and short wavelengths as indicated by the regions 96, 97 respectively; however, they exist primarily at low frequencies (as discussed hereinbefore with reference to FIG. 5). Thus, both $P_{acoustic}$ and $P_{vortical}$ exist in the long wavelength, low frequency region 96, and only $P_{vortical}$ exists in the short wavelength low frequency region 97.

The acoustic spatial filters 33, 35 (FIG. 1) discussed hereinbefore block or attenuate wavelengths longer than $\lambda$ as and frequencies below $f_{as}$, as indicated by the region 96. Also, the bandpass filters (BPF) 46, 56 (FIG. 1) block or attenuate high frequencies above $f_{pb}$ having short and long wavelengths as indicated by a region 102 and pass frequencies below $f_{as}$ where the $P_{vortical}$ signals exist. Thus, after processing by the spatial filters 33, 35 and the BPF's 46, 56, the resultant filtered signals $P_{asf}1$, $P_{asf}2$ on lines 48, 58 (FIG. 1) will be dominated by the short wavelength unsteady pressure disturbances $P_{vortical}$, as indicated by the region 97 (FIG. 6) at frequencies below $f_{pb}$, and as indicated by a portion 94 of the curve 90 in the BPF passband 95 (FIG. 5).

Accordingly, referring to FIG. 5, the spatial filters 33, 35 (FIG. 1) block the long wavelengths, which, for the acoustic pressure disturbances $P_{acoustic}$, occur at low frequencies as indicated to the left of a dashed line 92 for frequencies below the frequency $f_{as}$. A dashed line 93 indicates the attenuation of the acoustic pressure $P_{acoustic}$ signal 91 below the frequency $f_{as}$ at the output of the spatial filters. The vortical pressure disturbances $P_{vortical}$ are substantially not attenuated (or only slightly attenuated) because $P_{vortical}$ has short wavelengths at low frequencies that are substantially passed by the spatial filter. The BPFs 46, 56 (FIG. 1) block or attenuate frequencies outside the passband indicated by a range of frequencies 95, and passes the unsteady pressure disturbances associated with stochastic flow fields 15 (FIG. 1) within the passband 95.

Alternatively, instead of the filters 46, 56 being bandpass filters, provided the dc content is acceptably small, the filters 46, 56 may comprise low pass filters, having a bandwidth similar to the upper band of the high pass filters discussed hereinbefore. If a low pass filter is used as the filters 46, 56, the passband is shown as a range of frequencies 89. It should be understood that the filters 46, 56 are not required for the present invention if the PSD of the acoustic pressure disturbances $P_{acoustic}$ has substantially no or low PSD energy content in frequencies above the stopband of the spatial filter that does not adversely affect the measurement accuracy.

The pressure sensors 18, 20, 22, 24 described herein may be any type of optical pressure sensor, capable of measuring the unsteady (or ac or dynamic) pressures within a pipe, such as Bragg grating based pressure sensors. The Bragg grating based sensors 18–24 may comprise those that are described in U.S. patent application Ser. No. 08/925,598, entitled "High Sensitivity Fiber Optic Pressure Sensor For Use In Harsh Environments," filed Sep. 8, 1997. Alternatively, the sensors 18–24 may be electrical or optical strain gauges attached to or embedded in the outer or inner wall of the pipe and which measure pipe wall strain, including microphones, hydrophones, or any other optical sensor capable of measuring the unsteady pressures within the pipe 12. The fiber optic pressure sensors 18–24 may be connected individually or may be multiplexed along one or more optical fibers using wavelength division multiplexing (WDM), time division multiplexing (TDM), or any other optical multiplexing techniques (discussed more hereinafter).

Figure 10:
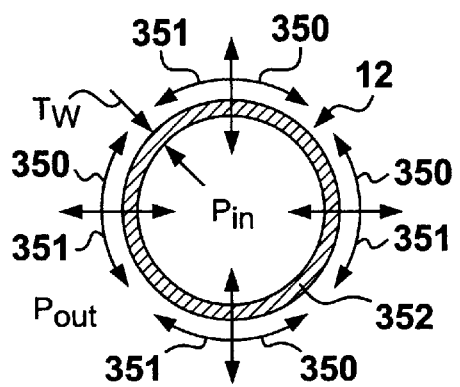
FIG. 10 is an end view of a pipe showing pressure inside and outside the pipe.

Referring to FIG. 10, if an optical strain gauge is used as one or more of the pressure sensors 18–24 (FIGS. 11–17), it may measure the unsteady (or dynamic or ac) pressure variations Pin inside the pipe 12 by measuring the elastic expansion and contraction of the pipe, as represented by arrows 350 and 351. In general, the optical strain gauges would measure the pipe wall deflection in any direction in response to unsteady pressure signals inside the pipe 12. The elastic expansion and contraction of pipe 12 is measured at the location of the strain gauge as the internal pressure $P_{in}$ changes, and thus measures the local strain (axial strain, hoop strain or off axis strain), caused by deflections in the directions indicated by arrows 351. The amount of change in the circumference is variously determined by the hoop strength of the pipe 12, the internal pressure $P_{in}$, the external pressure $P_{out}$ outside the pipe 12, the thickness $T_w$ of the pipe wall 352, and the rigidity or modulus of the pipe material.

Thus, the thickness of the pipe wall 352 and the pipe material in the sensor sections 14, 16 (FIG. 1) may be set based on the desired sensitivity of filter 33 and other factors and may be different from the wall thickness or material of the pipe 12 outside the sensing regions 14, 16.

Figure 11:
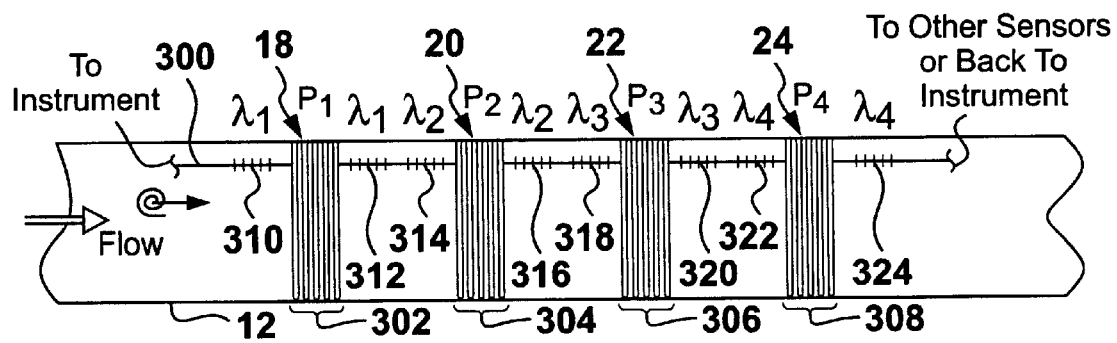
FIG. 11 is a side view of a pipe having an optical fiber wrapped around the pipe at each unsteady pressure measurement location, and a pair of Bragg gratings around each optical wrap.
Figure 12:
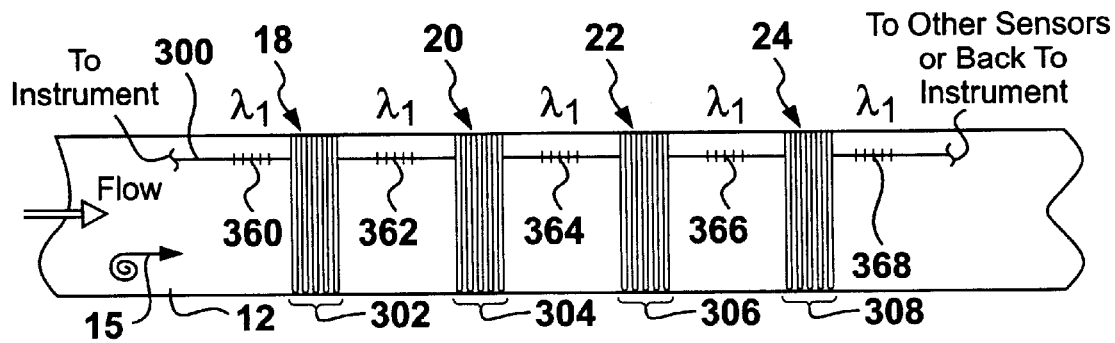
FIG. 12 is a side view of a pipe having an optical fiber wrapped around the pipe at each unsteady pressure measurement location with a single Bragg grating between each pair of optical wraps.
Figure 13:
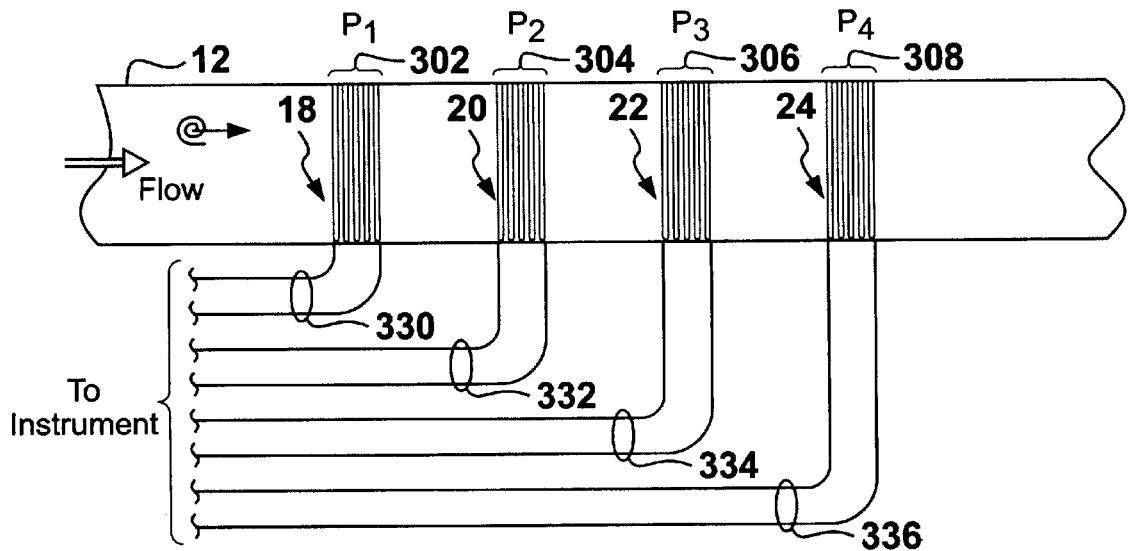
FIG. 13 is a side view of a pipe having an optical fiber wrapped around the pipe at each unsteady pressure measurement location without Bragg gratings around each of the wraps.

Referring to FIGS. 11, 12, and 13, if an optical strain gauge is used, the ac pressure sensors 18–24 may be configured using an optical fiber 300 that is coiled or wrapped around and attached to the pipe 12 at each of the pressure sensor locations as indicated by the coils or wraps 302, 304, 306, 308 for pressures $P_1$, $P_2$, $P_3$, $P_4$ respectively. The fiber wraps 302–308 are wrapped around the pipe 12 such that the length of each of the fiber wraps 302–308 changes with changes in pipe strain in response to unsteady pressure variations within the pipe 12, and thus internal pipe pressure is measured at each respective axial location. Such fiber length changes are measured using known optical measurement techniques as discussed hereinafter. Each of the wraps measures substantially the circumferentially averaged pressure within the pipe 12 at a corresponding axial location on the pipe 12, and furthermore provide axially averaged pressure over the axial length of a given wrap. While the structure of the pipe 12 provides some spatial filtering of short wavelength disturbances, it has been determined that the basic principle of operation of the invention remains substantially the same as that for the point sensors described hereinbefore.

Referring to FIG. 11, for embodiments of the present invention where the wraps 302, 304, 306, 308 are connected in series, pairs of Bragg gratings (310 and 312), (314 and 316), (318 and 320), (322 and 324) may be located along the fiber 300 at opposite ends of each of the wraps 302, 304, 306, 308 respectively. The grating pairs are used to multiplex the pressure signals $P_1$, $P_2$, $P_3$, $P_4$ to identify the individual wraps from optical return signals. The first pair of gratings 310, 312 around the wrap 302 may have a common reflection wavelength $\lambda_1$, and the second pair of gratings 314, 316 around the wrap 304 may have a common reflection wavelength $\lambda_2$, but different from that of the first pair of gratings 310, 312. Similarly, the third pair of gratings 318, 320 around the wrap 306 have a common reflection wavelength 3, which is different from $\lambda_1$ and $\lambda_2$, and the fourth pair of gratings 322, 324 around the wrap 308 have a common reflection wavelength $\alpha_4$, which is different from $\lambda_1$, $\lambda_2$ and $\lambda_3$.

Referring to FIG. 12, instead of having a different pair of reflection wavelengths associated with each wrap, a series of Bragg gratings 360–368 with only one grating between each of the wraps 302–308 may be used, each having a common reflection wavelength $\lambda_1$.

Referring to FIGS. 11 and 12, the wraps 302–308 with the gratings 310–324 (FIG. 11) or with the gratings 360–368 (FIG. 12) may be configured in numerous known ways to precisely measure the fiber length or change in fiber length, such as an interferometric, Fabry Perot, time-of-flight, or other known arrangements. An example of a Fabry Perot technique is described in U.S. Pat. No. 4,950,883, entitled "Fiber Optic Sensor Arrangement Having Reflective Gratings Responsive to Particular Wavelengths," to Glenn. One example of time-of-flight (or Time-Division-Multiplexing; TDM) would be where an optical pulse having a wavelength is launched down the fiber 300 and a series of optical pulses are reflected back along the fiber 300. The length of each wrap can then be determined by the time delay between each return pulse.

Alternatively, a portion or all of the fiber between the gratings (or including the gratings, or the entire fiber, if desired) may be doped with a rare earth dopant (such as erbium) to create a tunable fiber laser, such as is described in U.S. Pat. No. 5,317,576, entitled "Continuously Tunable Single Mode Rare-Earth Doped Laser Arrangement," to Ball et al., or U.S. Pat. No. 5,513,913, entitled "Active Multipoint Fiber Laser Sensor," to Ball et al., or U.S. Pat. No. 5,564,832, entitled "Birefringent Active Fiber Laser Sensor," to Ball et al., all of which are incorporated herein by reference.

While the gratings 310–324 are shown oriented axially with respect to pipe 12, in FIGS. 11, 12, they may be oriented along the pipe 12 axially, circumferentially, or in any other orientations. Depending on the orientation, the grating may measure deformations in the pipe wall 352 with varying levels of sensitivity. If the grating reflection wavelength varies with internal pressure changes, such variations may be desired for certain configurations (e.g., fiber lasers) or may be compensated for in the optical instrumentation for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 300.

Referring to FIG. 13, alternatively, the sensors 18–24 may also be formed as individual non-multiplexed purely interferometric sensors by wrapping the pipe 12 with the wraps 302–308 without using Bragg gratings, where separate fibers 330, 332, 30 334, 336 may be fed to the separate wraps 302, 304, 306, 308 respectively. In this particular embodiment, known interferometric techniques may be used to determine the length or change in length of the fiber 10 around the pipe 12 caused by pressure changes, such as Mach Zehnder or Michaelson Interferometric techniques, such as are described in U.S. Pat. No. 5,218,197, entitled "Method and Apparatus for the Non-invasive Measurement of Pressure Inside Pipes Using a Fiber Optic Interferometer Sensor," to Carroll.

The interferometric wraps may be multiplexed such as is described in Dandridge et al., "Fiber Optic Sensors for Navy Applications," IEEE, February 1991, or Dandridge et al., "Multiplexed Interferometric Fiber Sensor Arrays," SPIE, Vol. 1586, 1991, pp. 176–183. Other techniques to determine the change in fiber length may be used. Also, reference optical coils (not shown) may be used for certain interferometric approaches and may also be located on or around the pipe 12, but may be designed to be insensitive to pressure variations.

Figure 14:
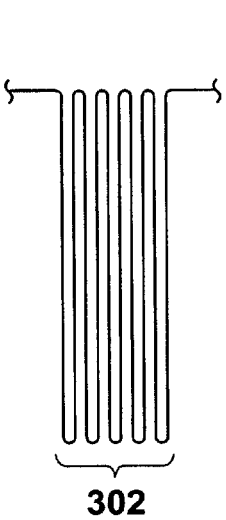
FIG. 14 is an alternative geometry of an optical wrap of FIGS. 14, 15, and 16 of a radiator tube geometry.
Figure 15:
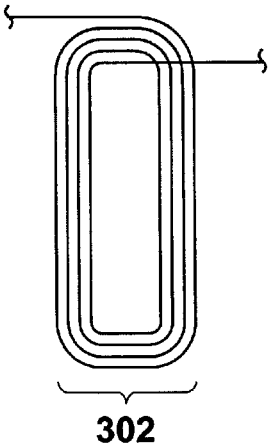
FIG. 15 is an alternative geometry of an optical wrap of FIGS. 14, 15, and 16 of a race track geometry.

Referring to FIGS. 14 and 15, instead of the wraps 302–308 being optical fiber coils wrapped completely around the pipe 12, the wraps 302–308 may have alternative Is geometries, such as a "radiator coil" geometry (FIG. 14) or a "race-track" geometry (FIG. 18), which are shown in a side view as if the pipe 12 is cut axially and laid flat. In this particular embodiment, the wraps 302–208 are not necessarily wrapped 360 degrees around the pipe, but may be disposed over a predetermined portion of the circumference of the pipe 12, and have a length long enough to optically detect the changes to the pipe circumference. Other geometries for the wraps may be used if desired. Also, for any geometry of the wraps described herein, more than one layer of fiber may be used depending on the overall fiber length desired. The desired axial length of any particular wrap is set depending on the characteristics of the ac pressure desired to be measured, e.g., the axial length of the pressure disturbance caused by a vortex to be measured.

Figure 16:
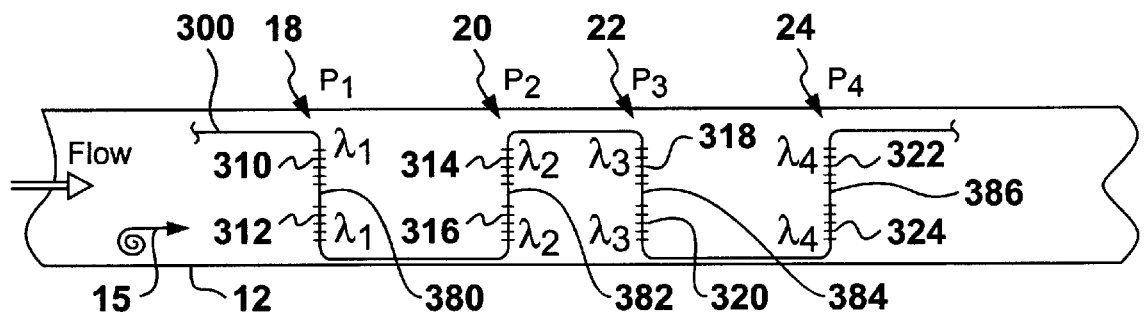
FIG. 16 is a side view of a pipe having a pair of gratings at each axial sensing location.
Figure 17:
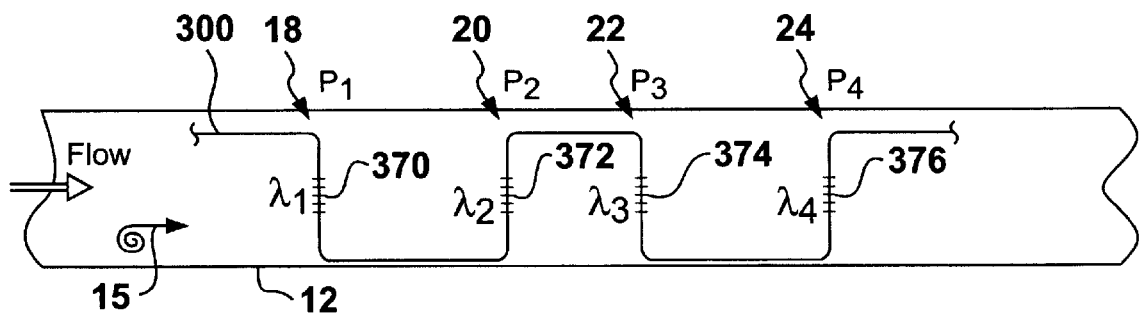
FIG. 17 is a side view of a pipe having a single grating at each axial sensing location.

Referring to FIGS. 16 and 17, embodiments of the present invention include configurations where instead of using the wraps 302–308, the fiber 300 may have shorter sections that are disposed around at least a portion of the circumference of the pipe 12 that can optically detect changes to the pipe circumference. It is further within the scope of the present invention that sensors may comprise an optical fiber 300 disposed in a helical pattern (not shown) about pipe 12. As discussed above, the orientation of the optical strain sensing element will vary the sensitivity to deflections in pipe wall 352 caused by unsteady pressure transients in the pipe 12.

Referring to FIG. 16, in particular, the pairs of Bragg gratings (310 and 312), (314 and 316), (318 and 320), (322 and 324) are located along the fiber 300 with sections 380–386 of the fiber 300 between each of the grating pairs respectively. In this arrangement, known Fabry Perot, interferometric, time-of-flight, or fiber laser sensing techniques may be used to measure the strain in the pipe, in a manner similar to that described in the aforementioned references.

Referring to FIG. 17, alternatively, individual gratings 370–376 may be disposed on the pipe and used to sense the unsteady variations in strain in the pipe 12 (and thus the unsteady pressure within the pipe) at the sensing locations. When a single grating is used per sensor, the grating reflection wavelength shift will be indicative of changes in pipe diameter and thus pressure.

Any other technique or configuration for an optical strain gauge may be used. The type of optical strain gauge technique and optical signal analysis approach is not critical to the present invention, and the scope of the invention is not intended to be limited to any particular technique or approach.

For any of the embodiments described herein, the optical pressure sensors, including optical fibers and/or gratings among others as described herein, may be attached to the pipe by adhesive, glue, epoxy, tape or other suitable attachment means to ensure suitable contact between the sensor and the pipe 12. The sensors may alternatively be removable or permanently attached via known mechanical techniques such as by mechanical fasteners, by a spring loaded arrangement, by clamps, by a clamshell arrangement, by strapping, or by other equivalents. Alternatively, the optical strain gauges, including optical fibers and/or gratings, may be embedded in a composite pipe. If desired, for certain applications, the gratings may be detached from (or strain or acoustically isolated from) the pipe 12 if desired.

Figure 7:
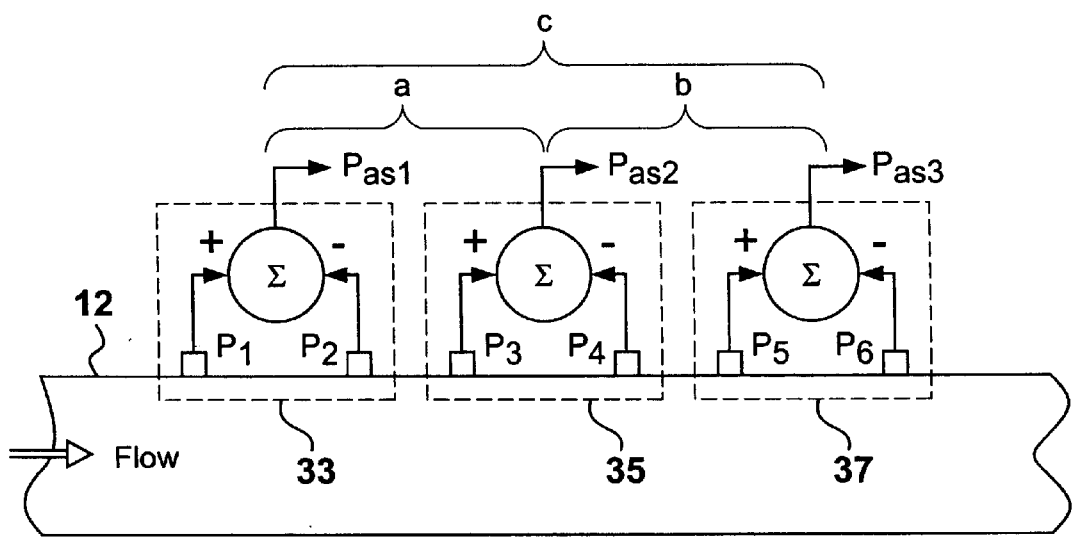
FIG. 7 is a side view of a pipe having three pairs of unsteady pressure sensors spaced axially along the pipe.

Referring to FIG. 7, there is shown an embodiment of the present invention comprising three spatial filters 33, 35, 37 each comprising a pair of optical pressure sensors measuring at total of six unsteady pressures $P_1$–$P_6$ (three pairs), each pressure sensor being a plurality (e.g., 10 meters) of fiber optic wraps and the sensors being evenly axially spaced at 1.8 inches apart. The pipe has an inner diameter of 3.0 inches, a wall thickness of 0.22 inches, and is made of J55 steel production tubing. The three spatial filters 33, 35, 37 provide spatially filtered ac pressure signals $P_{as1}$, $P_{as2}$, $P_{as3}$ respectively.

These ac pressure signals $P_{sa1}$, $P_{as2}$, $P_{as3}$ may be used as input to a variety of devices and used as desired. It is within the scope of the present invention that any number of spatial filters and spatial time filters may be used and that the particular embodiment will dictate the quantity of and the spacings 51, 52 between each spatial filter. It is noted that although pressure sensors are shown as point sensors, it is within the scope of the present invention that the sensors comprise any configuration capable of accurately detecting pressure changes in pipe 12, including fiber optic wraps as described herein.

Figure 8:
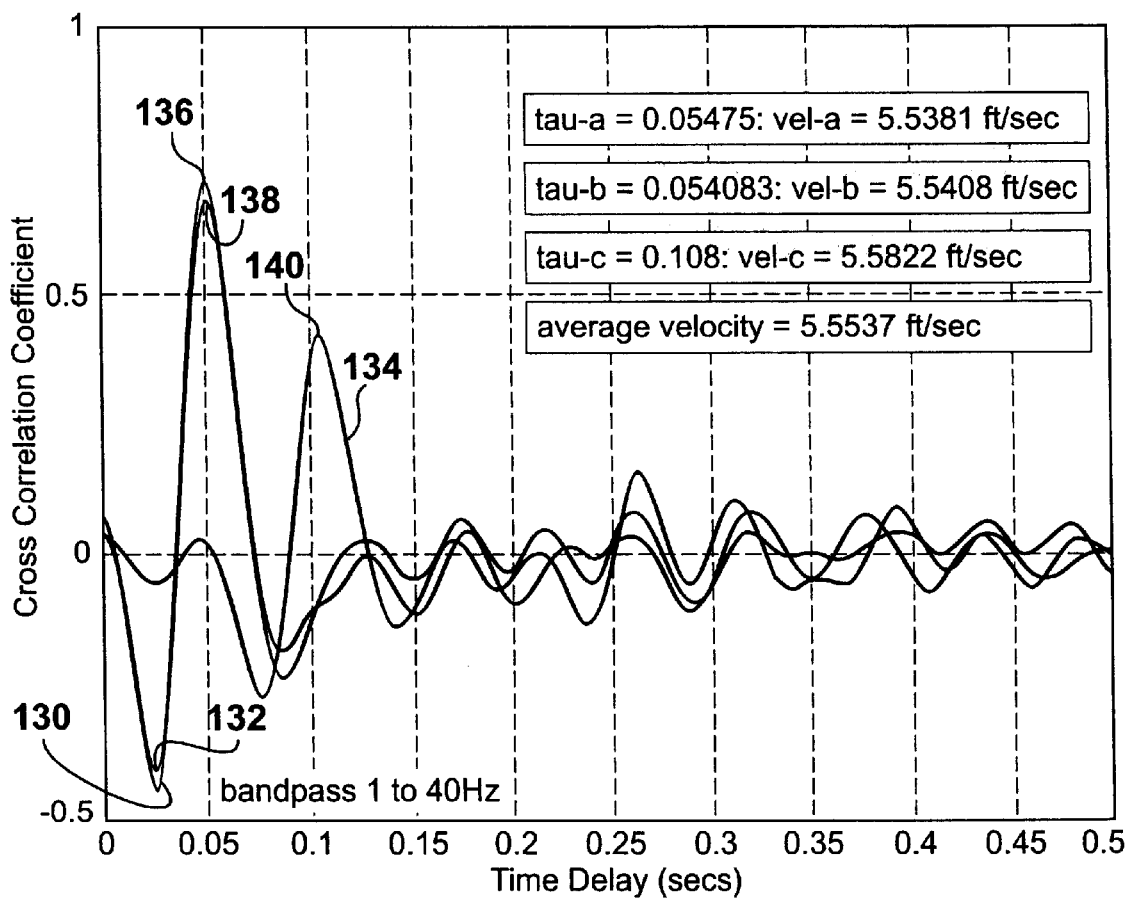
FIG. 8 is a graph of a cross correlation coefficient versus time delay for the three pairs of sensors.

Referring to FIG. 8, for the configuration of FIG. 7, and for a liquid flow mixture of 100% oil flowing at 111.2 gal/minute (or about 5.05 ft/sec for a 3-inch pipe), the invention provides cross-correlation curves 130, 132, and 134. The curves 130, 132, 134 correspond to velocities of 5.538 ft/sec, 5.541 ft/sec, and 5.5822 ft/sec for the cross-correlation between $P_{sa1}$ and $P_{as2}$ (vel-a), $P_{as2}$ and $P_{as3}$ (vel-b), and $P_{as1}$ and $P_{as3}$ (vel-c) respectively for the groups of sensors a, b, and c shown in FIG. 7.

Figure 9:
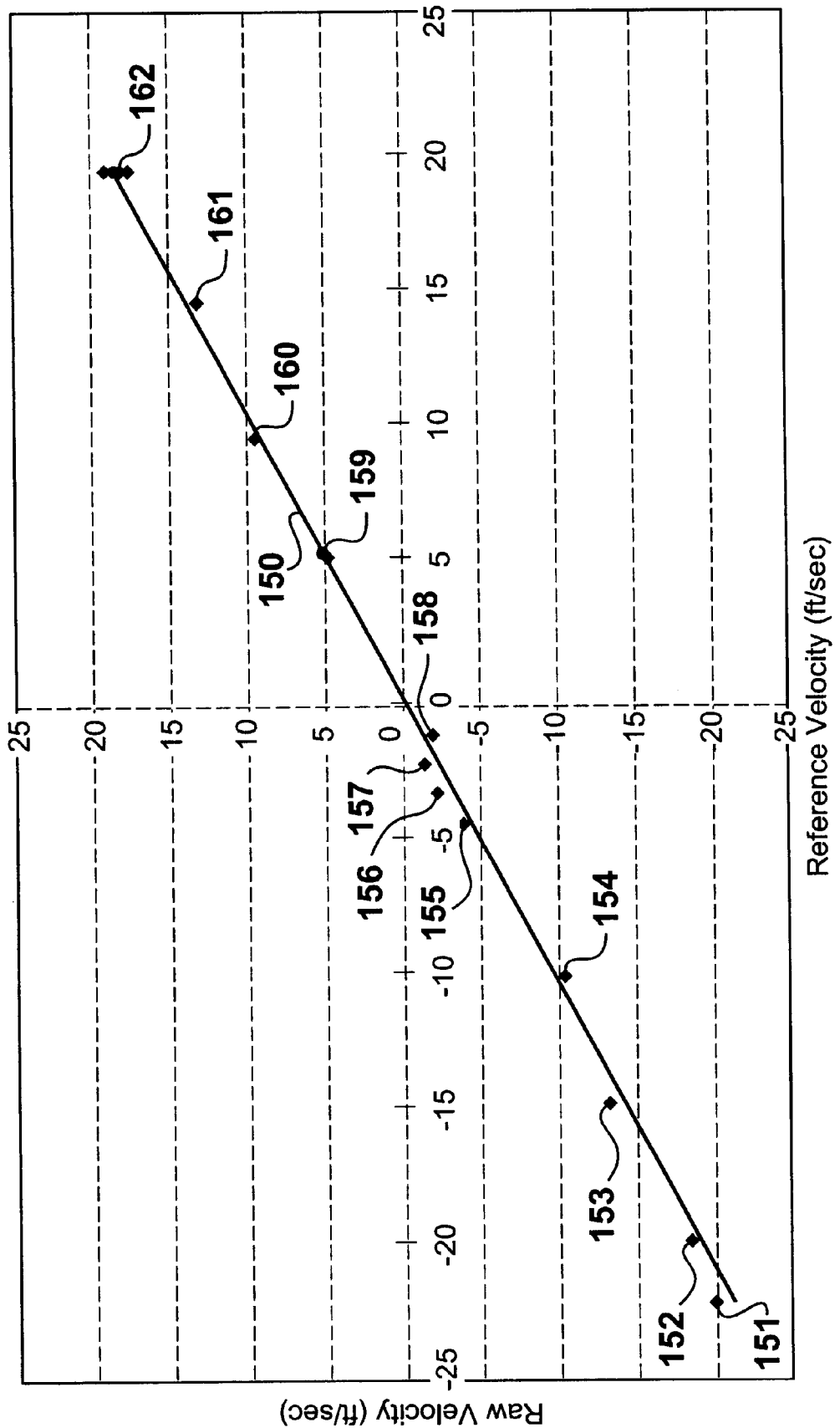
FIG. 9 is a graph of measured flow rate against reference flow rate for various different mixtures.

Referring to FIG. 9, it is shown that the present invention will work over a wide range of oil/water mixtures. In particular, the first two pairs of sensors ($P_1$, $P_2$ and $P_3$, $P_4$) of FIG. 7 measured the velocity at various flow rates against a reference velocity value. Data points 151–162 are groupings of measured velocity data points derived from the sensors ($P_1$, $P_2$, $P_3$, $P_4$) and are plotted against a reference velocity line 150. The data points 151–162 also show the invention will work for fluid flowing in either direction in the pipe 12. The negative flow data points 151–158 were taken with a fluid of 100% oil and the positive flow data points 159–162 were taken over a range of various oil/water mixtures. Specifically, data points 159 represent 100 individual data points taken at velocities from about 5.2 ft/sec to about 5.7 ft/sec and in oil/water mixtures ranging from 0% to 100% water. Data point 160 represents a single individual data point taken at a velocity of about 9.9 ft/sec in an oil/water mixture of 0% water. Data point 161 represents a single individual data point taken at velocity of about 13.7 ft/sec in an oil/water mixture of 0% water. Similarly, data points 162 represent 21 individual data points taken at velocities from about 18.0 ft/sec to about 19.0 ft/sec and in oil/water mixtures ranging from 0% to 100% water. The departure of the raw data 151–162 from the reference velocity line 150 is caused, in part, by the fact that the points were not calibrated and that the reference velocity at each point was taken manually by a technician. Had the data points been calibrated and electronically matched to the sensed points, the departure from the reference line 150 would not have been as large as depicted in the figure.

The present invention will thus work over a wide range of oil/water/gas mixtures. Also, the invention will work for very low flow velocities, e.g., at or below 1 ft/sec (or about 20.03 gal/min in a 3 inch diameter inner diameter pipe) and has no maximum flow rate limit. Further, the invention will work with the pipe 12 being oriented vertical, horizontal, or any other orientation. The invention will also work equally well independent of the direction of the flow along the pipe 12.

Figure 18:
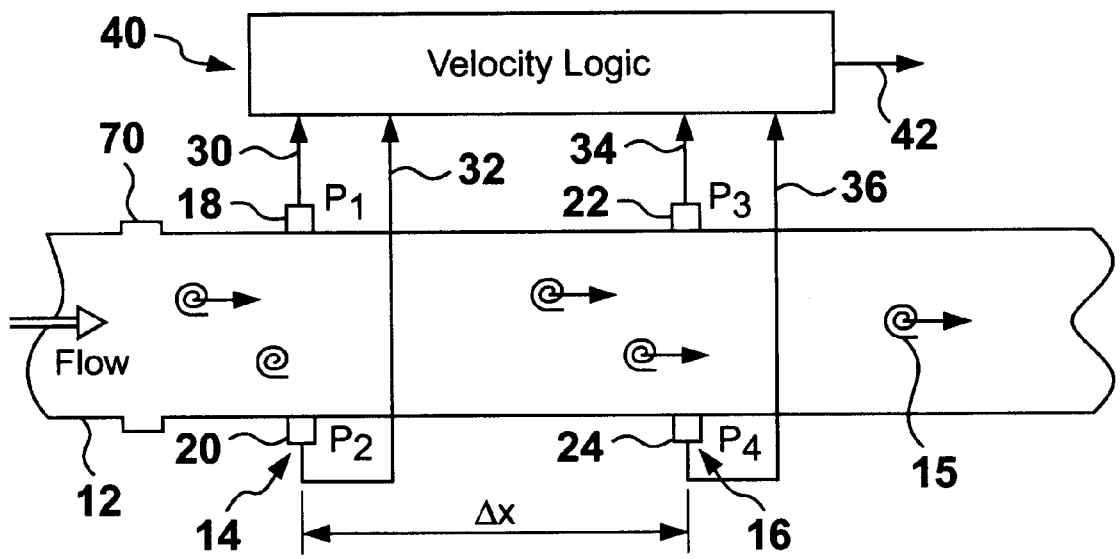
FIG. 18 is a side view of a pipe having two pair of pressure sensors where the sensors in each pair are located across the pipe from each other.

Referring to FIG. 18, instead of the unsteady pressure sensors 18, 20 and the corresponding unsteady pressure signals $P_1$, $P_2$ being spaced axially along the pipe 12, the sensors 18, 20 may be spaced circumferentially apart at substantially the same axial location. For example, pressure sensors 18, 20, may comprise pairs of Bragg gratings (as shown in FIG. 13) spaced circumferentially about pipe 12. In that case, the spatial filter 33 (FIG. 1) (i.e., the difference between the two signals $P_1$, $P_2$, $P_3$, $P_4$) filters out substantially all one-dimensional acoustic waves propagating through the sensing region 14.

Figure 19:
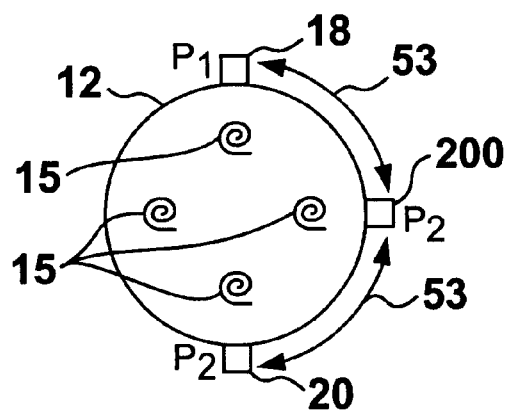
FIG. 19 is an end view of a pipe showing a pair of pressure sensors located at various circumferential spacing from each other.
Figure 20:
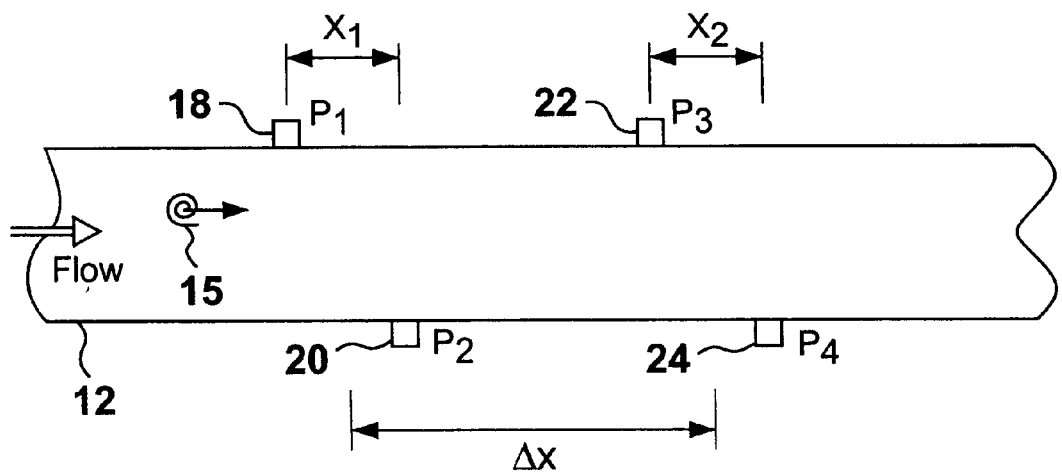
FIG. 20 is a side view of a pipe having two pair of pressure sensors where the sensors in each pair are located transversely across the pipe and spaced axially along the pipe from each other.

Alternatively, referring to FIG. 19, instead of the pressure sensors 18, 20 being located directly across from each other, the signal $P_2$ may be measured at a distance circumferentially closer to the sensor 18, as indicated by a sensor 200. The circumferential distance 53 between the two sensors 18, 200 should be large enough to independently measure a propagating vortical pressure field 15 such that the spatial filter 33 output is not zero for the measured vortex 15, i.e., such that the circumferential distance 53 is greater than the transverse spatial (and coherence) length of vortex 15. In addition, the distance $X_1$ (FIG. 1) should be less than or equal to the axial coherence length of the vortex 15, i.e., such that the spatial filter output is indicative of a measured vortex 15.

The thickness and rigidity of the outer wall of the pipe 12 is related to the acceptable spacing $X_1$ (FIG. 1) between the sensors 18, 20 of the spatial filter 33. More specifically, the thinner or less rigid the pipe 12 wall, the closer the sensors 18, 20 can be to each other.

Also, for optimal performance, the distance $X_1$ between the two sensors 18, 20 should be larger than the spatial (axial or transverse) length of the vortical pressure field 15 such that each of the sensors 18, 20 can independently measure the io propagating vortical pressure field 15 between the sensors 18, 20 at different times (i.e., such that the spatial filter 33 output is not zero for the measured vortex 15).

Also, the distance $X_1$ should be within the coherence length of the vortex 15 such that the spatial filter output is indicative of a measured vortex 15. Also, for optimal performance, the overall length $L_1$ between the first sensor 18 and the last sensor 24 of the velocity sensing section should be within the coherence length of the vortices 15 desired to be measured. The coherence length of the vortical flow field 15 is the length over which the vortical flow field remains substantially coherent, which is related to and scales with the diameter of the pipe 12.

Vortices that are sensed by only one of the spatial filters, because either a vortex is generated between the spatial filters or is generated outside the spatial filters and decays between them, will be substantially random events (in time and location) that will not be correlated to the vortices that are sensed by and continuously occurring past both spatial filters and, as such, will not significantly affect the accuracy of the measurement.

Figure 21:
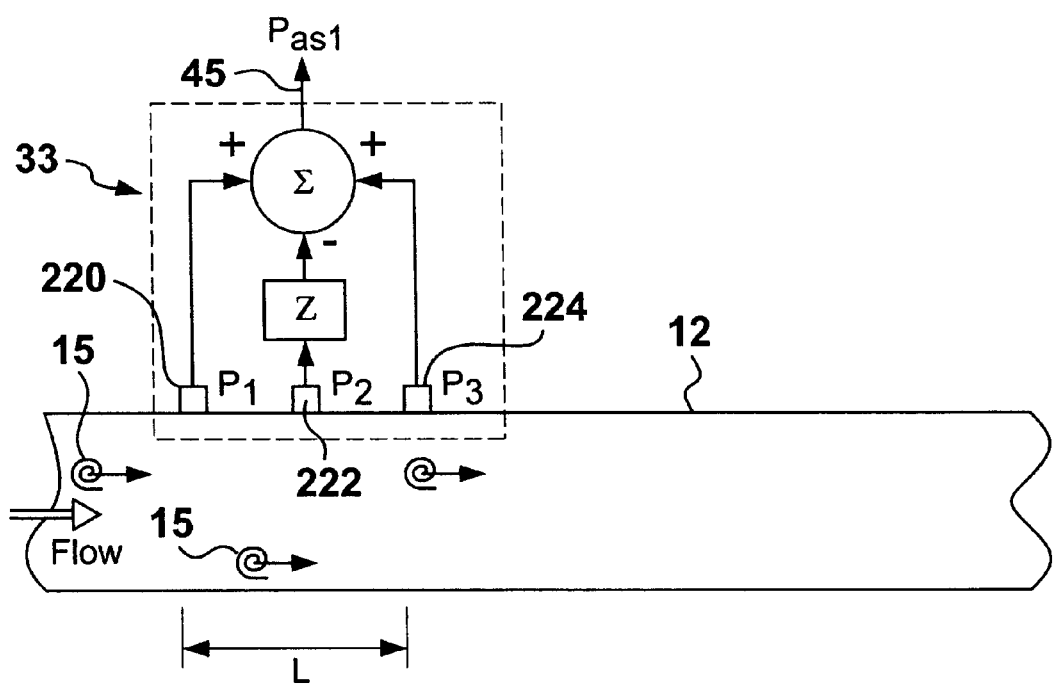
FIG. 21 is a side view of a pipe having a set of three pressure sensors that form a spatial filter.

Referring to FIG. 21, a particular embodiment of the present invention is shown therein where more than two sensors may be used for one or both of the spatial filters 33, 35. In particular, the summer 44 may have three inputs $P_1$, $P_2$, $P_3$ from three pressure sensors 220, 222, 224, providing an output signal $P_{sa1}=P_1-2P_2+P_3$. For optimal performance, the overall axial length L of the filter 33 should be within the coherence length of the vortices 15 being measured and the individual spacing between the sensors 220, 222, 224 should have the same criteria discussed hereinbefore for the spacing between two sensors 18, 20.

Figure 29:
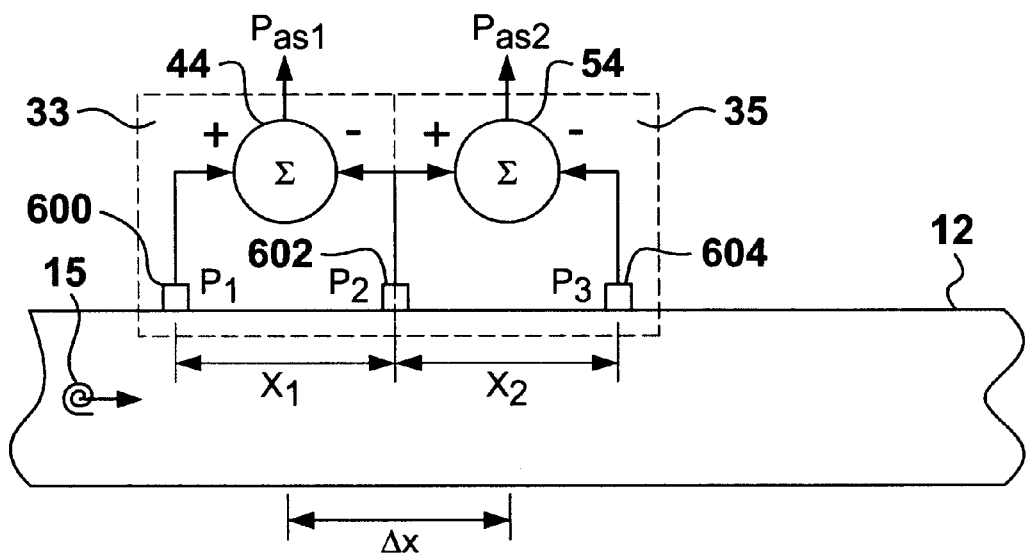
FIG. 29 is a side view of a pipe having a set of three pressure sensors that make up two spatial filters.

Referring to FIG. 29, instead of using four pressure sensors to make the spatial filters 33, 35, three pressure sensors 600, 602, 604 may be used where the middle sensor 602 is used for both the spatial filters 33, 35.

Referring to FIGS. 25–28, instead of measuring the unsteady pressures $P_1$–$P_4$ on the exterior of the pipe 12, the invention will also work when the unsteady pressures are measured inside the pipe 12. In particular, the pressure sensors 18, 20 that measure the pressures $P_1$, $P_2$ may be located anywhere within the pipe 12, and having the same constraints discussed earlier for exterior measurements. Any technique may be used to measure the unsteady pressures inside the pipe 12.

Figure 22:
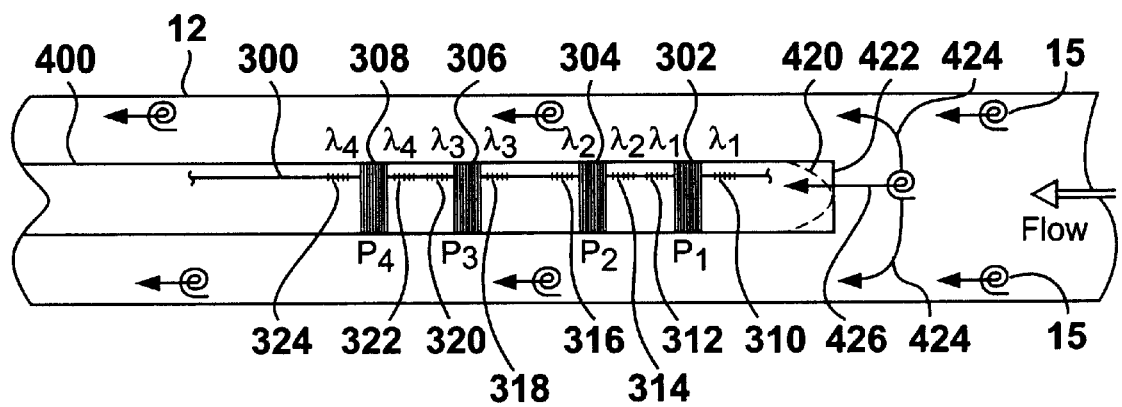
FIG. 22 is a side view of a pipe having an inner tube with axially distributed optical fiber wraps for unsteady pressure sensors.
Figure 23:
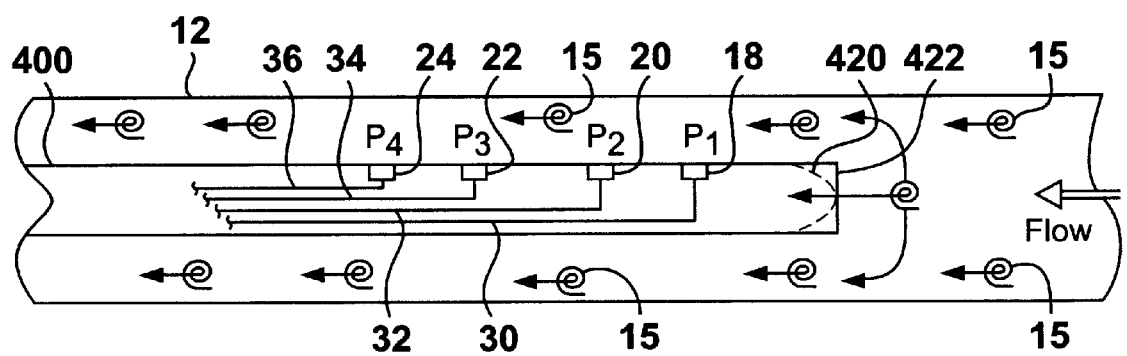
FIG. 23 is a side view of a pipe having an inner tube with axially distributed unsteady pressure sensors located along the tube.
Figure 24:
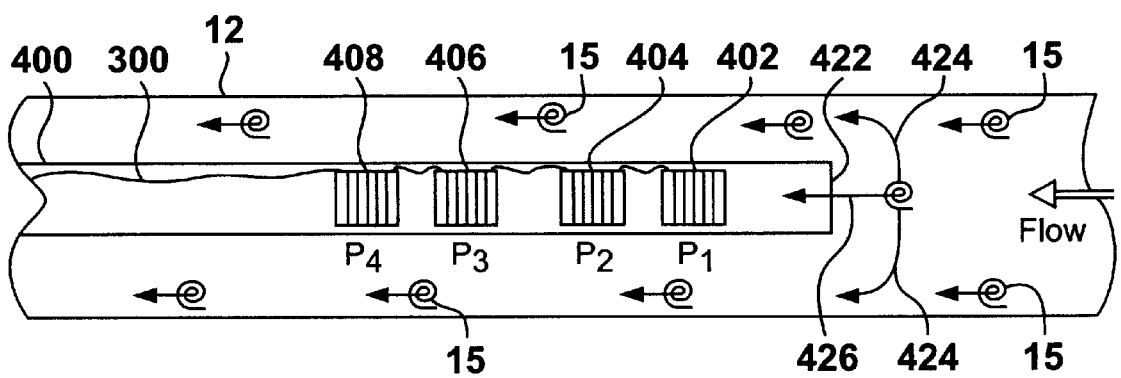
FIG. 24 is a side view of a pipe having an inner tube with four axially distributed optical fiber wrapped hydrophones located within the tube.
Figure 25:
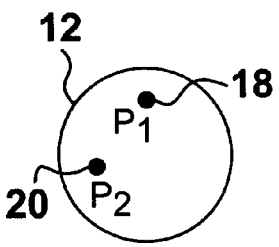
FIG. 25 is an end view of a pipe showing a pair of pressure sensors spaced apart from each other within the pipe.
Figure 26:
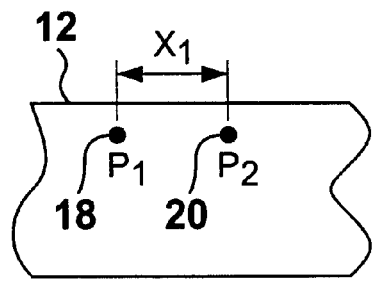
FIG. 26 is a side view of a pipe having a pair of unsteady pressure sensors spaced axially within the pipe.
Figure 27:
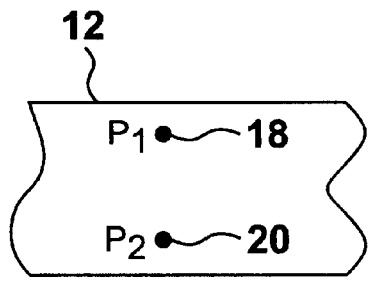
FIG. 27 is a side view of a pipe having a pair of unsteady pressure sensors spaced transversely within the pipe.
Figure 28:
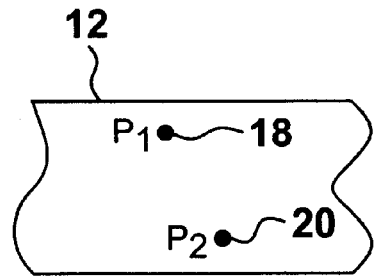
FIG. 28 is a side view of a pipe having a pair of unsteady pressure sensors axially and radially spaced within the pipe.

Referring to FIGS. 22–24, the invention may also measure the velocity of flow outside a pipe or tube 400. In that case, the tube 400 may be placed within the pipe 12 and the pressures $P_1$–$P_4$ measured at the outside of the tube 400. Any technique may be used to measure the unsteady pressures $P_1$–$P_4$ outside the tube 400.

Referring to FIG. 22, for example, the tube 400 may have optical wraps 302–308 wrapped around the tube 400 at each sensing location. Alternatively, any of the strain sensors, or displacement, velocity, or accelerometer sensors, or techniques described herein, may be used on the tube 400. Referring to FIG. 23, alternatively, the pressures $P_1$–$P_4$ may be measured using direct pressure measurement sensors or techniques described herein. Any other type of unsteady pressure sensors 18–24 may be used to measure the unsteady pressures within the pipe 12.

Alternatively, referring to FIG. 24, hydrophones 402–408 may be used to sense the unsteady pressures within the pipe 12. In this arrangement, the hydrophones 402–408 may be located in the tube 400 for ease of deployment or for other reasons. The hydrophones 402–408 may be fiber optic, electronic, piezoelectric or other types of hydrophones. If fiber optic hydrophones are used, the hydrophones 402–408 may be connected in series or in parallel along the common optical fiber 300.

The tube 400 may be made of any material that allows the unsteady pressure sensors to measure the pressures $P_1$–$P_4$ and may be hollow, solid, or gas filled or fluid filled. One example of a dynamic pressure sensor is described in U.S. Pat. No. 6,233,374, entitled "Mandrel Wound Fiber Optic Pressure Sensor," issued May 15, 2001. Also, the end 422 of the tube 400 may be closed or open. If the end 422 is closed, the flow path would be around the end 422 as indicated by lines 424. If the end 422 is open, the flow path would be through the inside of the tube, as indicated by a line 426, and the pressure would be measured inside of the pipe 12. For oil and gas well applications, the tube 400 may be coiled tubing having the pressure sensors for sensing $P_1$–$P_4$ inside the tubing 400.

Although the invention has been described with respect to the detection of certain types of unsteady flow fields and the pressure disturbances associated therewith, it should be understood that the invention will also detect any unsteady stochastic flow field and its associated pressure field that propagates within the flow, provided the spatial filters have a separation within the acceptable coherence length of the flow field to be measured and the sensor spacing within each spatial filter is longer than a characteristic axial length of the disturbance. Some examples of such other stochastic flow fields are gas bubbles, gas slugs, particles, or chunks of material which may travel in the flow at different rates than the mean flow velocity, thereby creating a traveling pressure disturbance which exhibits a velocity slip between it and the other constituents in the mixture.

Figure 30:
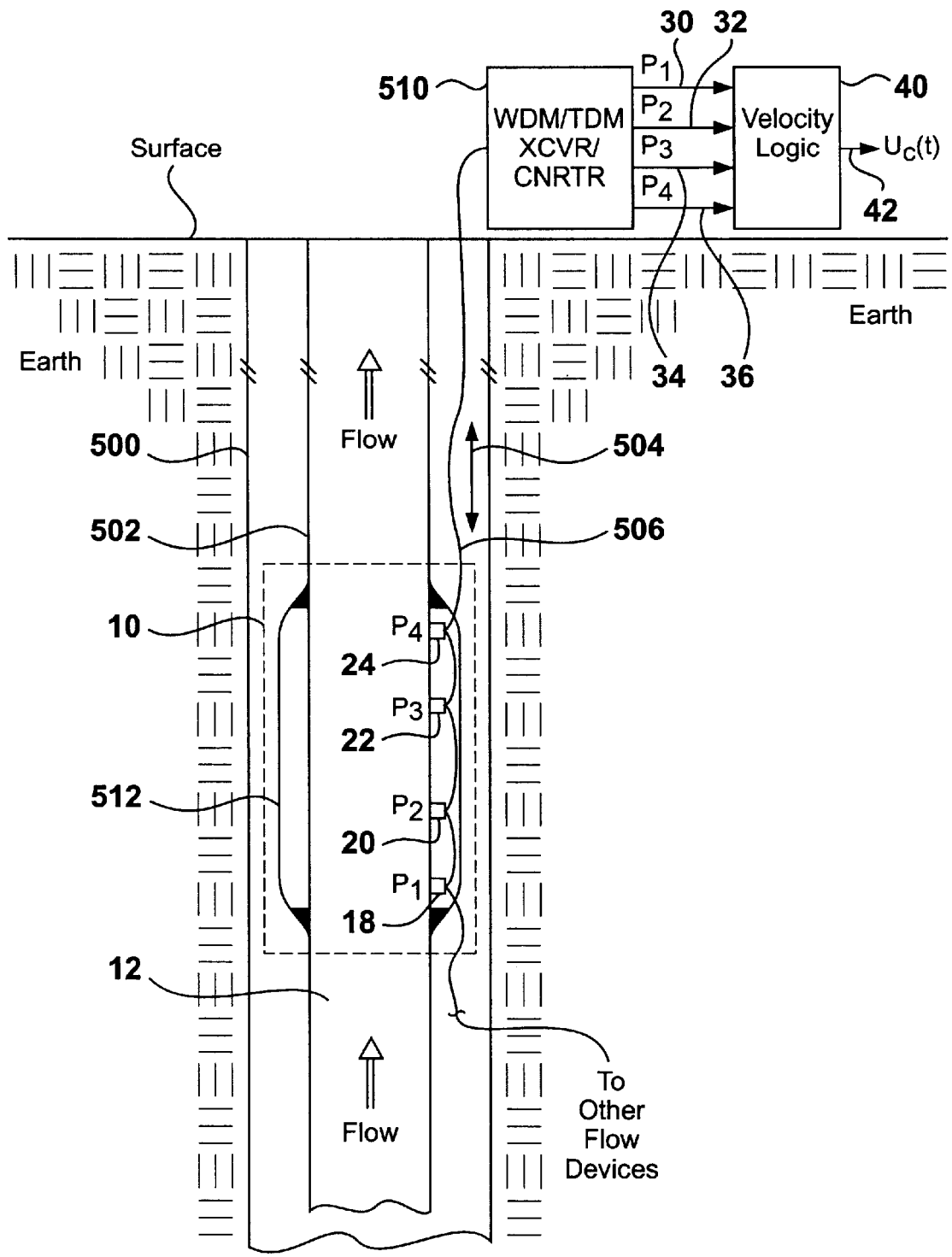
FIG. 30 is a schematic drawing of a flow meter in a well.
Figure 31:
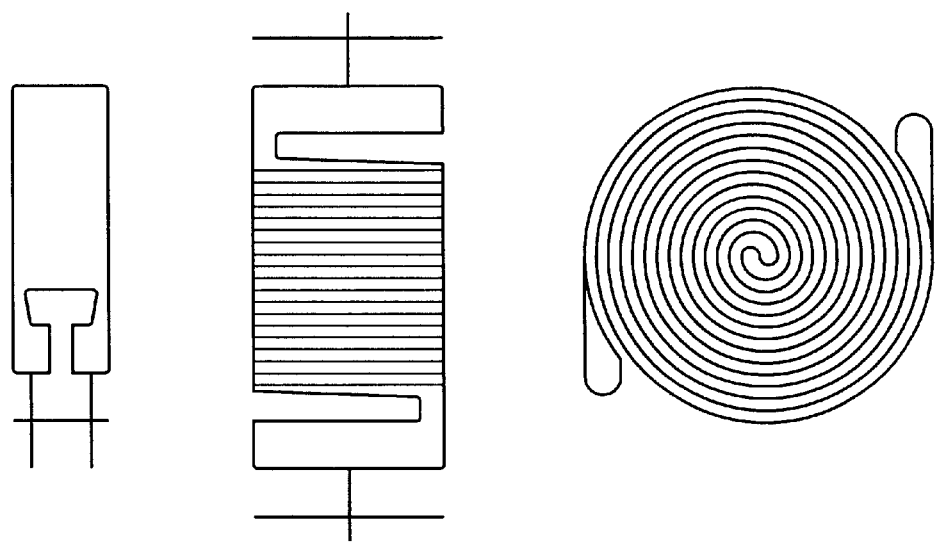
FIG. 31 is a plan view of alternate geometries for electronic strain gauges.
Figure 32:
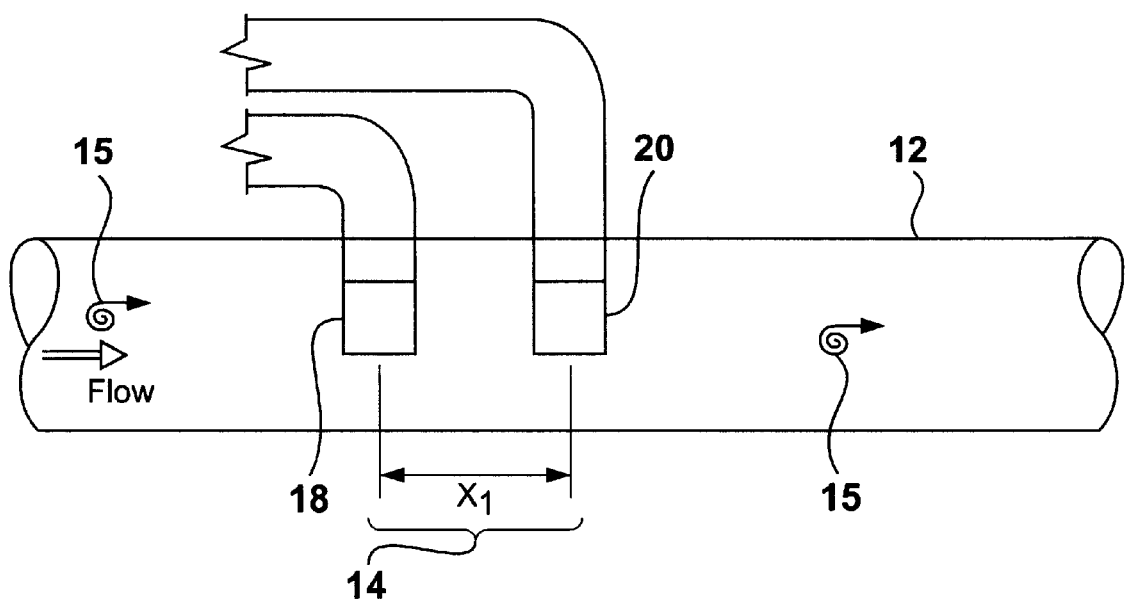
FIG. 32 is a side view of a pipe having a spatial filter disposed thereon comprised of electronic strain gauges.

Referring to FIG. 30, there is shown an embodiment of the present invention in an oil or gas well application. The sensing section 10 may be connected to or part of production tubing 502 within a well 500. An outer housing, sheath, or cover 512 may be located over the sensors 18–24 and attached to the pipe 12 at its axial ends to protect the sensors 18–24 (or fibers) from damage during deployment, use, or retrieval, and/or to help isolate the sensors from external pressure effects that may exist outside the pipe 12, and/or to help isolate ac pressures in the pipe 12 from ac pressures outside the pipe 12. The sensors 18–24 are connected to a cable 506 which may comprise the optical fiber 300 and is connected to a transceiver/converter 510 located outside the well.

The transceiver/converter 510 may be used to receive and transmit optical signals to and from the sensors 18–24 and to provide output signals indicative of the pressure $P_1$–$P_4$ at the sensors 18–24 on the lines 30–36, respectively. The transceiver/converter 510 may constitute part of the velocity logic 40. The transceiver/converter 510 may be any device that performs the corresponding functions described herein. In particular, the transceiver/converter 510, together with the optical sensors described hereinbefore, may use any type of optical grating-based measurement technique, e.g., scanning interferometric, scanning Fabry Perot, acoustooptic-tuned filter (AOTF), optical filter, time-of-flight, etc., having sufficient sensitivity to measure the ac pressures within the pipe, such as that described in one or more of the following references: A. Kersey et al., "Multiplexed Fiber Bragg Grating Strain-Sensor System With a Fabry-Perot Wavelength Filter", Opt. Letters, Vol. 18, No. 16, August 1993; U.S. Pat. No. 5,493,390, issued Feb. 20, 1996 to Mauro Verasi, et al.; U.S. Pat. No. 5,317,576, issued May 31, 1994 to Ball et al.; U.S. Pat. No. 5,564,832, issued Oct. 15, 1996 to Ball et al.; U.S. Pat. No. 5,513,913, issued May 7, 1996 to Ball et al.; U.S. Pat. No. 5,426,297, issued Jun. 20, 1995 to Dunphy et al.; U.S. Pat. No. 5,401,956, issued Mar. 28, 1995 to Dunphy et al.; U.S. Pat. No. 4,950,883, issued Aug. 21, 1990 to Glenn; and U.S. Pat. No. 4,996,419, issued Feb. 26, 1991 to Morey, all of which are incorporated by reference. Also, the pressure sensors described herein may operate using one or more of the techniques described in the aforementioned references.

A plurality of the sensors 10 of the present invention may be connected to a common cable and multiplexed together using any known multiplexing technique.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A fiber optic strain gauge based velocity meter for measuring a velocity of a fluid moving in a pipe, comprising:
   a first filter comprised of at least one fiber optic strain gauge which measures a vortical pressure field at a first axial location along the pipe and provides a first pressure signal indicative of said vortical pressure field;
   a second filter comprised of at least one fiber optic strain gauge which measures said vortical pressure field at a second axial location along the pipe and provides a second pressure signal indicative of said vortical pressure field; and
   a signal processor, responsive to said first and said second pressure signals, which provides a velocity signal indicative of a velocity of the said vortical pressure field moving in the pipe,
   wherein said vortical pressure field comprises an inhomogeneous pressure field.

2. The apparatus of claim 1, wherein said velocity signal is related to a velocity of said fluid moving in said pipe.

3. The apparatus of claim 1, wherein said velocity signal is indicative of the velocity of said fluid moving in said pipe.

4. The apparatus of claim 1, further comprising a fiber optic strain gauge based volumetric flow meter wherein said signal processor provides a flow signal indicative of the volumetric flow rate of said fluid flowing in said pipe.

5. The apparatus of claim 1, wherein said first and said second filters filter out wavelengths associated with an acoustic pressure field and passes wavelenths associated with said vortical pressure field.

6. The apparatus of claim 5, wherein said first filter comprises a first spatial filter, and said second filter comprises a second spatial filter.

7. The apparatus of claim 6, wherein said first and second spatial filters filter out wavelengths above a predetermined wavelength.

8. The apparatus of claim 6, wherein said first and second spatial filters filter out wavelengths above a predetermined wavelength and frequencies below a predetermined frequency.

9. The apparatus of claim 6, wherein:
   said first spatial filter comprises at least a first and a second fiber optic strain gauge disposed a predetermined first distance apart from each other; and
   said second spatial filter comprises at least a third and a fourth fiber optic strain gauge disposed a predetermined second distance apart from each other.

10. The apparatus of claim 9, wherein said at least one of said fiber optic strain gauges are disposed on a surface of the pipe.

11. The apparatus of claim 10, wherein said surface is an outer surface of said pipe.

12. The apparatus of claim 9, wherein said fiber optic strain gauge comprises at least one Bragg grating.

13. The apparatus of claim 1, wherein said first and said second filters filter out wavelengths associated with an acoustic pressure field and passes wavelengths associated with said inhomogeneous pressure field.

14. The apparatus of claim 1, wherein said signal processor comprises logic which calculates a cross-correlation between said first and said second vortical pressure signals and provides a time delay signal indicative of the time for said vortical pressure field to move from said first location to said second location.

15. The apparatus of claim 14, wherein said signal processor comprises logic responsive to said time delay signal which provides a vortical velocity signal indicative of the velocity of said vortical pressure field moving in said pipe.

16. the apparatus of claim 14, wherein said signal processor comprises logic responsive to said time delay signal which provides said velocity signal indicative of the velocity of said fluid moving in said pipe.

17. The apparatus of claim 1, wherein said signal processor comprises filter logic responsive to said first and said second pressure signals, which filters out a predetermined range of frequencies.

18. The apparatus of claim 17, wherein said filter logic comprises a band pass filter.

19. A method for measuring a velocity of a fluid moving in a pipe, the method comprising:
  a) measuring an inhomogeneous vortical pressure field with a fiber optic strain gauge at a first location along the pipe and providing a first vortical pressure signal indicative of said vortical pressure field;
  b) measuring said vortical pressure field with a fiber optic strain gauge at a second location along the pipe and providing a second vortical pressure signal indicative of said vortical pressure field, said first and said second locations being an axial distance apart; and
  calculating the velocity using said first and said second vortical pressure signals.

20. The method of claim 19, wherein said calculating step (c) comprises:
  (d) calculating a cross-correlation of said first and said second pressure signals to obtain a time delay signal indicative of the time for said vortical pressure field to move from said first location to said second location.

21. The method of claim 20, wherein said calculating step (d) comprises:
  e) calculating said velocity signal from said time delay signal.

22. The method of claim 21, wherein said calculating step (e) comprises:
  f) dividing said axial distance between said measurement locations by said time delay signal.

23. The method of claim 19, wherein:
  said measuring step (a) comprises: measuring a first pressure and a second pressure; subtracting said second pressure from said first pressure to form said first vortical pressure signal; and
  said measuring step (b) comprises: measuring a third pressure and a fourth pressure; and subtracting said fourth pressure from said third pressure to form said second vortical pressure signal.

24. The method of claim 23, wherein said step of measuring said first and said second pressures comprises measuring a strain of the pipe.

25. The method of claim 23, wherein said step of measuring said third and said fourth pressures comprises measuring a strain of the pipe.

26. The method of claim 19, wherein:
  said first vortical pressure signal is indicative of wavelengths associated with a vortical pressure field and not associated with an acoustic pressure field at said first location; and
  said second vortical pressure signal is indicative of wavelengths associated with said vortical pressure field and not associated with an acoustic pressure field at said second location.

27. The method of claim 20, wherein said measuring steps (a) and (b) comprise measuring a strain of the pipe.

28. The method of claim 19, further comprising calculating the volumetric flow rate of said fluid.

* * * * *

UNITED STATES PATENT AND TRADEMARK OFFICE
CERTIFICATE OF CORRECTION

PATENT NO. : 6,536,291 B1
DATED : March 25, 2003
INVENTOR(S) : Gysling et al.

It is certified that error appears in the above-identified patent and that said Letters Patent is hereby corrected as shown below:

Column 6,
Line 38, please delete "$U_c(t) = \Delta X / \tau \, U_f(t)$" and insert -- $U_c(t) = \Delta X / \tau \, \alpha \, U_f(t)$ --.

Column 7,
Line 57, please delete "$\alpha = a/f \text{ or } f = a/\lambda$" and insert -- $\lambda = a/f \text{ or } f = a/\lambda$ --.

Column 16,
Line 40, please delete "wavelenths" and insert -- wavelengths --.

Column 17,
Line 13, please delete "16. the apparatus" and insert -- 16. The apparatus --.

Column 18,
Line 5, please delete "calculating said velocity" and insert -- calculating a velocity --; and
Line 35, please delete "claim 20" and insert -- claim 19 --.

Signed and Sealed this

Fifteenth Day of July, 2003

JAMES E. ROGAN
*Director of the United States Patent and Trademark Office*